(12) United States Patent
Burcher et al.

(10) Patent No.: US 12,371,318 B2
(45) Date of Patent: Jul. 29, 2025

(54) HYDROGEN CARRIER COMPOUNDS

(71) Applicant: HYSILABS SAS, Aix-en-Provence (FR)

(72) Inventors: Benjamin Burcher, Saint-Jorioz (FR); Vincent Lome, Chateaurenard (FR); Remy Benoit, Villeneuves-les-Avignon (FR); Cyril Bosset, Lyons (FR); Etienne Airiau, Vienne (FR); Yannick Escudie, Nousty (FR)

(73) Assignee: HYSILABS SAS (FR)

( * ) Notice: Subject to any disclaimer, the term of this patent is extended or adjusted under 35 U.S.C. 154(b) by 686 days.

(21) Appl. No.: 17/769,936

(22) PCT Filed: Oct. 29, 2020

(86) PCT No.: PCT/EP2020/080464
§ 371 (c)(1),
(2) Date: Apr. 18, 2022

(87) PCT Pub. No.: WO2021/084044
PCT Pub. Date: May 6, 2021

(65) Prior Publication Data
US 2022/0388840 A1    Dec. 8, 2022

(30) Foreign Application Priority Data
Oct. 31, 2019    (EP) ..................... 19306419

(51) Int. Cl.
*C01B 3/00* (2006.01)
*C01B 3/06* (2006.01)
*C08L 83/04* (2006.01)

(52) U.S. Cl.
CPC .............. *C01B 3/0015* (2013.01); *C01B 3/06* (2013.01); *C08L 83/04* (2013.01)

(58) Field of Classification Search
CPC ......... C01B 3/001; C01B 3/0015; C01B 3/06; C07F 7/0838; C08G 77/12; C08G 77/16;
(Continued)

(56) References Cited

U.S. PATENT DOCUMENTS 2,547,678 A    4/1951    Wilcock et al.
3,615,272 A  * 10/1971    Collins ................... C01B 33/04
423/325

(Continued)

FOREIGN PATENT DOCUMENTS

DE    2345923 A1 *  9/1973
JP    2000231002 A *  8/2000
(Continued)

OTHER PUBLICATIONS

Armand et al. DE2345923A1 English Machine Translation (Year: 1973).*
(Continued)

*Primary Examiner* — Sally A Merkling
*Assistant Examiner* — Jordan W Taylor
(74) *Attorney, Agent, or Firm* — MASCHOFF BRENNAN

(57) ABSTRACT

The present invention relates to siloxane hydrogen carrier compounds and to a method for producing hydrogen from said siloxane hydrogen carrier compounds.

33 Claims, 5 Drawing Sheets

(58) Field of Classification Search
CPC ......... C08G 77/24; C08G 77/38; C08L 83/04;
Y02E 60/32; Y02E 60/36; Y02P 20/133
See application file for complete search history.

(56) References Cited

U.S. PATENT DOCUMENTS

| 8,097,690 B2* | 1/2012 | Harimoto | C03C 3/06 |
| | | | 106/287.34 |
| 2011/0294933 A1* | 12/2011 | Jaunky | C08G 77/46 |
| | | | 524/265 |

FOREIGN PATENT DOCUMENTS

| WO | 2007018283 A1 | 2/2007 | |
| WO | WO-2012062562 A2 * | 5/2012 | ........... C01B 33/043 |
| WO | 2019211301 A1 | 11/2019 | |
| WO | 2010094785 A1 | 8/2020 | |

OTHER PUBLICATIONS

Tsuji et al. JP2000231002A English Machine Translation (Year: 2003).*
Muh et al. WO2012062562A2 English Machine Translation (Year: 2012).*
Ervithayasuporn et al. Dalton Trans, 2013, 42, 13747 (Year: 2013).*
Seyferth et al. Inorg. Chem. 1983, 22, 2163-2167 (Year: 1983).*
European Patent Office; International Search Report and Written Opinion issued in Int'l App. No. PCT/2020/080464 dated Feb. 5, 2021; 17 pages.

* cited by examiner

Step 2:  a) $1\ SiO_2 + 4\ HF \longrightarrow 1\ SiF_4 + 2\ H_2O$ or b) $1\ SiO_2 + 1\ Si \longrightarrow 2\ SiO$ or c) $1\ SiO_2 + 2\ H_2 \longrightarrow 1\ Si + 2\ H_2O$

Step 3:  a') $1\ SiF_4 + 2\ H_2 \longrightarrow 1\ Si + 4\ HF$ or b) $1\ SiF_4 + 4\ Na \longrightarrow 1\ Si + 4\ NaF$ or c) $2\ SiO + 2\ H_2 \longrightarrow 2\ Si + 2\ H_2O$

Step 4:  $1\ Si + 2\ HX \xrightarrow{\text{Multistep process}} 1\ H_2SiX_2$

Step 5:  $n\ H_2SiX_2 + (n-y)\ H_2O \longrightarrow y\ X\text{-}(H_2SiO)_x\text{–}SiH_2X + 2(n-y)\ HX$

Figure 2

$^1$H NMR spectrum of the Cl-(H$_2$SiO)$_x$-SiH$_2$Cl species $H_2$ production from 1 g of $ClH_2SiO$-$(H_2SiO)_x$-$SiH_2Cl$ species mixture centered on the $ClH_2SiO$-$(H_2SiO)_{14}$-$SiH_2Cl$ species

HYDROGEN CARRIER COMPOUNDS

CROSS-REFERENCE TO RELATED APPLICATIONS

This patent application is a nationalization of PCT Application No. PCT/EP2020/080464 filed Oct. 29, 2020, which claims priority to EP 19306419.3 filed Oct. 31, 2019, which applications are incorporated herein by specific reference in their entirety.

BACKGROUND

Field

The present invention relates to siloxane hydrogen carrier compounds and to a method for producing hydrogen from said siloxane hydrogen carrier compounds. The present invention also relates to a process for producing and for regenerating said siloxane hydrogen carrier compounds.

Description of Related Art

The ability to store, transport and release hydrogen in a safe, convenient, and environment-friendly manner source and to produce and store hydrogen efficiently, economically and safely, are main challenges to be overcome in order to democratize the use of hydrogen as an energy vector.

Currently hydrogen is mainly delivered either by pipeline, by tube trailers as a compressed gas or by special tankers in its liquefied form.

There are typically six routes for hydrogen delivery: it can be transported as a gas by pipeline, it can be produced on site, it can be transported as a compressed gas in tube trailers (for example as disclosed in WO2013/109918 (A1)), it can be transported as a condensed liquid in cryogenic trucks (for example as disclosed in WO2011/141287 (A1)), it can be stored in a solid-state hydrogen carrier material and released on-site (for example as disclosed in WO2009/080986 (A2)), and stored in a liquid-state hydrogen carrier material and released on-site.

Hydrogen can be produced on-site by two means. It can be produced on site by one process and directly consumed in another process which is defined as captive hydrogen. The other mean of on-site production is by water electrolysis, which produces hydrogen from water and electricity. It can be considered producing an environment-friendly hydrogen if powered by renewable energy.

In addition to incumbent delivery solutions which are cryogenic and compressed hydrogen, alternative solutions are emerging to provide hydrogen: hydrogen carriers. Hydrogen carriers are either solid-state or liquid-state materials that have the ability to store hydrogen and release it when needed. They bring advantages either for transport or storage, compared to incumbent solutions. Solid-state carriers include metallic hydrides enabling the uptake of hydrogen, by adsorption onto metal particles resulting in metal hydride.

Among them, the magnesium hydride is stable at low pressure and standard temperature, making it convenient to transport and store. When needed, the material is heated to release the hydrogen gas. Solid-state solutions have been identified as best suited for same-site reversible processes of energy storage from renewable energies. Indeed, handling solid materials is not as convenient as handling gas or liquid ones.

Liquid hydrogen carriers can be any liquid-state material able to release hydrogen under specific conditions. The class of Liquid Organic Hydrogen Carriers (LOHC) is the most represented among the liquid hydrogen carriers. During the process called hydrogenation, which is a catalytic reaction, requiring energy in the form of heat, hydrogen is chemically bonded to the liquid organic carrier. Typically, the carrier, being unsaturated and/or aromatic hydrocarbons such as toluene, is reacted with hydrogen to produce the corresponding saturated hydrocarbon, to be transported in a liquid-sate at standard temperature and pressure, for example as described in WO2014/082801(A1) or WO2015/146170 (A1). Although the amount of hydrogen to be stored in LOHC depends on the yield of the hydrogenation process it is up to 7.2% mass of hydrogen contained per mass of liquid carrier. Then the hydrogen is released from the saturated hydrocarbons by a process called dehydrogenation, which is a catalytic reaction, requiring additional energy in the form of heat (above 300° C. typically) due to the endothermic nature of the reaction. In order to produce on-demand hydrogen, heat may be produced from grid electricity (without control on its origin and on its impact on the environment) or heat may be retrieved by burning a part of the organic carrier.

One of the most promising class of hydrogen carrier compounds is silicon hydrides. Indeed, they exhibit theoretical hydrogen weight gravimetric efficiencies above 10 wt % and present the considerable advantage to release the hydrogen they contain in a spontaneous and exothermic reaction when contacted with a proton source (for ex. water) and the appropriate catalyst(s). Polymethylhydrosiloxane ("PHMS") is one example of liquid and moisture/air/temperature stable silicon hydride hydrogen carrier compound. Patent applications WO2010070001(A1), EP2206679(A1), WO2011098614(A1) and WO2010094785(A1) relate to a method for producing hydrogen from PHMS. However, PHMS presents the tremendous disadvantage to contain carbon fragments, ultimately leading to carbon oxide ($CO_2$ typically) emissions, hence hampering a complete carbon-free recycling process.

Poly(dihydro)siloxanes ("PHS") represent the most promising carbon-free alternative to PHMS since it possibly does not contain any carbon atom in its structure and in addition improves drastically the mass of hydrogen per mass of liquid carrier (up to 14 wt %). PHS can be found under two main structural forms: either linear (hence bearing chain ends) or cyclic. It was known prior to our intervention that both linear and cyclic poly(dihydro)siloxane compounds could be attained. As examples, in patent application U.S. Pat. No. 2,547,678A, linear poly(dihydro)siloxanes with carbon-containing chain ends were obtained and used as oils exhibiting low viscosity-temperature coefficients. In the same objective, GB638586A discloses the synthesis of linear PHS with various chain terminations whereas copolymers of the general formula $[(H_2SiO)_m(Me_2SiO)_n]$ were obtained in GB788983A. Academic literature also offers examples of syntheses and characterisations of linear species as in [*Inorganic Chemistry*, Vol. 23, No. 26, 1984, 4412-4417] were compounds centered around the structure $ClSiH_2O[SiH_2O]_{23}SiH_2Cl$ are isolated.

Regarding cyclic compounds, cyclic dihydrogenpolysiloxanes having a weight-average molecular weight ranging in value from 1,500 to 1,000,000 were synthesized in US2010188766(A1) for resin applications. WO2007118473 (A1) and US2009041649(A1) disclose a non-hydrolytic path using carbonates to access cyclic poly(dihydro)siloxanes with structures composed by four to six $[H_2SiO]$ repeating units. Similar product composition was attained by the classical $H_2SiCl_2$ hydrolysis route in U.S. Pat. No. 2,810,628A. Finally, [*Inorganic Chemistry*, Vol. 22, No 15, 1983, 2163-2167] depicts by the same method the access to a mixture of cyclic poly(dihydro)siloxanes with repeating units ranging from 4 to 23. The product mixture was claimed to be stable a few days at room temperature in chlorinated solvents.

Our prior invention, Hysilabs WO2019211301, published on 7th of November 2019, relates to a process for producing and for regenerating siloxane hydrogen carrier compounds. Although several reports of the patent or academic literature depict the access to poly(dihydro)siloxanes, there remains a need for improvement towards a more energy efficient and atom-economical pathway. In addition, the stability of the isolated product has to be dramatically improved in order to democratize their unprecedented use as hydrogen carrier compounds. Indeed, the isolated poly(dihydro)siloxane mixtures have to remain stable on long time ranges, meaning at least at the month scale, instead of a few days with the current knowledge.

SUMMARY

The present invention relates to liquid linear siloxane hydrogen carrier compounds of formula (I):

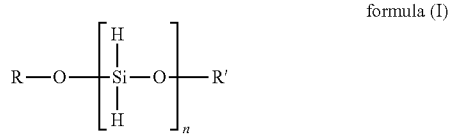

formula (I)

wherein n is an integer (representing the number of repeating units) superior or equal to one, preferably superior or equal to 2, for example superior or equal to 3, or even superior or equal to four, and wherein R and R' comprises Si and hydrogen and/or oxygen and/or halogen, wherein radicals R and R' don't contain carbon and wherein R and/or R' comprises halogen. In an embodiment of the present invention, n is inferior or equal to 500, for example inferior or equal to 50.

BRIEF DESCRIPTION OF THE FIGURES

FIG. 2 illustrates examples the siloxane production individual process steps.

DETAILED DESCRIPTION

Figure 1:
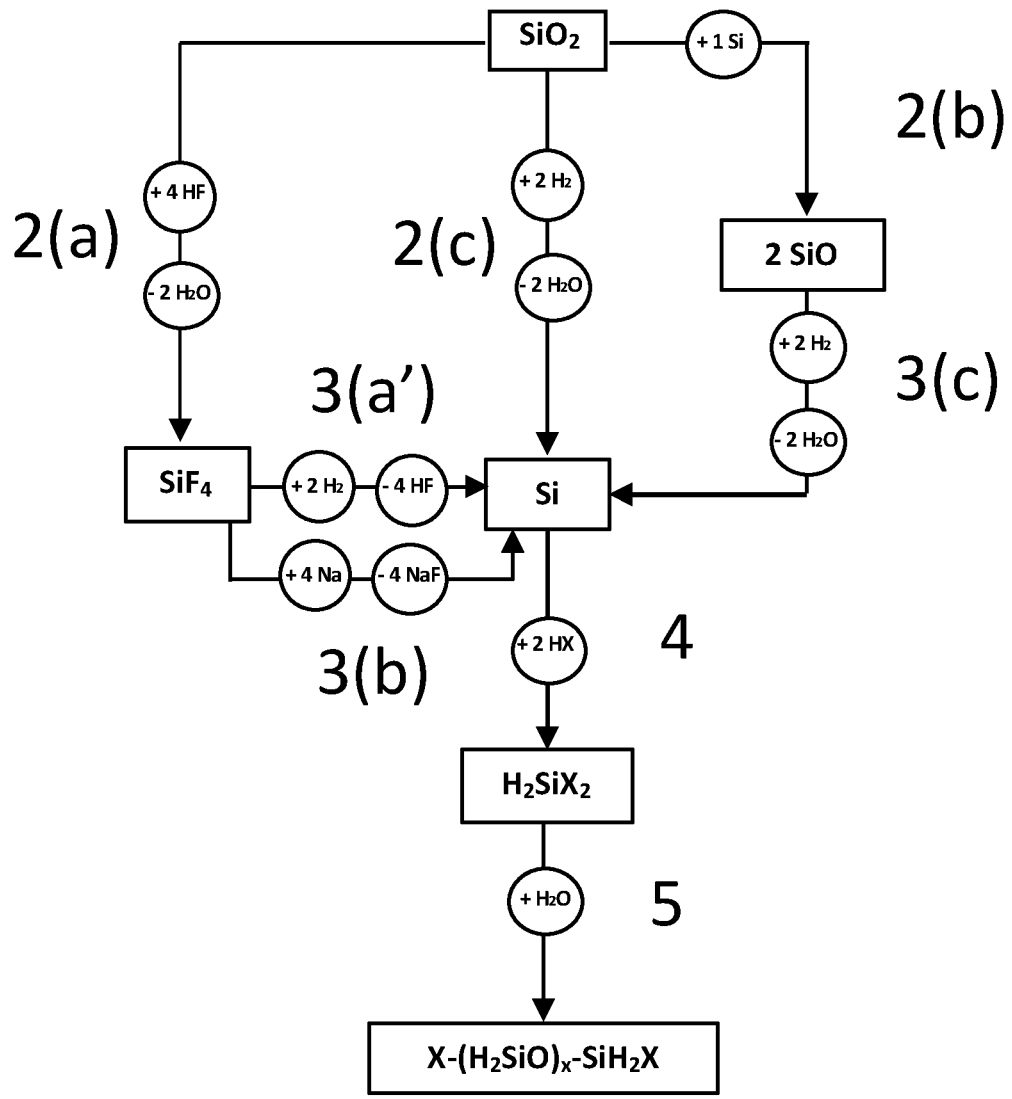
FIG. 1 illustrates examples the siloxane production individual process steps.

As explained and demonstrated hereafter, the Applicants have found that a halogen termination in at least one chain end of the said formula (I) carbon-free linear siloxane hydrogen carrier compounds provides many advantages over the prior art; in an embodiment of the present invention, both chain ends of the said formula (I) carbon-free linear siloxane hydrogen carrier compounds have a halogen termination.

In an embodiment of the present invention, the above carbon-free R and R' radicals are selected from $-SiH_3$, $-SiH_2X$, $-SiHX_2$, and $-SiX_3$, $-SiH_2OH$, $-SiH(OH)_2$, $-Si(OH)_3$ with X being a halogen, preferably a halogen selected from F, Cl, Br and I, more preferably Cl, with the proviso that R and/or R' comprises halogen.

Illustrative examples of the liquid linear siloxane hydrogen carrier compounds according to the present invention are:

$H_3SiOH_{2n}SinO_nSiH_2X$, $H_3SiOH_{2n}Si_nO_nSiHX_2$,
$H_3SiOH_{2n}Si_nO_nSiX_3$, $XH_2SiOH_{2n}Si_nO_nSiH_2X$,
$XH_2SiOH_{2n}Si_nO_nSiHX_2$, $XH_2SiOH_{2n}Si_nO_nSiH_2OH$,
$XH_2SiOH~Si_nO_nSiH(OH)_2$, $XH_2SiOH_{2n}Si_nO_nSi(OH)_3$,
$X_2HSiOH_{2n}Si_nO_nSiH_2X$, $X_2HSiOH_{2n}Si_nO_nSiHX_2$,
$X_2HSiOH_{2n}Si_nO_nSiH_2OH$, $X_2HSiOH_{2n}Si_nO_nSiH(OH)_2$,
$X_2HSiOH~Si_nO_nSi(OH)_3$, $X_3SiOH_{2n}Si_nO_nSiH_2X$,
$X_3SiOH_{2n}Si_nO_nSiHX_2$, $X_3SiOH_{2n}Si_nO_nSiX_3$,
$X_3SiOH_{2n}Si_nO_nSiH_2OH$, $X_3SiOH_{2n}Si_nO_nSiH(OH)_2$,
$X_3SiOH_{2n}Si_nO_nSi(OH)_3$, or a mixture of one or more of these compounds, with X being a halogen, preferably a halogen selected from F, Cl, Br and I, more preferably Cl, and with n being an integer superior or equal to 1, preferably superior or equal to 2, for example superior or equal to 3, or even superior or equal to four. In an embodiment of the present invention, n is inferior or equal to 500, for example inferior or equal to 50. According to the present invention, the halogen terminated carbon-free liquid linear siloxane hydrogen carrier compounds according to the present invention are liquid (at normal temperature and pressure (NTP); e.g. at a temperature of 20° C. and an absolute pressure of $1.01325 \times 10^5$ Pa).

As explained and demonstrated hereafter, the halogen terminated carbon-free liquid linear siloxane hydrogen carrier compounds according to the present invention present many advantages:

Excellent weight gravimetric efficiency of the siloxane compound, meaning a high ratio between the weight of hydrogen carried by the compound compared to its overall molecular weight.

Straightforward and without any carbon emissions recycling of the claimed compounds when compared to carbon-containing prior art compounds.

Favorable stability impact when combined with other silanes/siloxanes hydrogen carrier compounds.

Possible further functionalization of chain ends.

The present invention also relates to blends of the claimed liquid linear siloxane hydrogen carrier compounds together with cyclic silanes and/or cyclic siloxanes. A class of cyclic siloxanes which can advantageously be used in our claimed blends are preferably selected amongst the following compounds.

Liquid Cyclic Siloxane Hydrogen Carrier Compounds

Said liquid cyclic siloxane hydrogen carrier compounds which can be used in the blends are advantageously selected amongst the cyclic siloxane compounds having the formula (II)

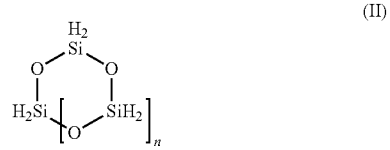

(II)

wherein n is an integer (representing the number of repeating units H2SiO) superior or equal to one, preferably superior or equal to 2, for example superior or equal to 3, or even superior or equal to four. In an embodiment of the present invention, n is inferior or equal to 500, for example inferior or equal to 32, for example inferior or equal to 17.

In an embodiment according to the present invention, the liquid siloxane hydrogen carrier compounds of formula (I) and of formula (II) present a dynamic viscosity between 0.1 and 10000 mPa·s at a temperature of 20° C. and a pressure of $1.01325 \times 10^5$ Pa. In an embodiment according to the present invention, the liquid siloxane hydrogen carrier compounds of formula (I) and of formula (II) present a dynamic viscosity between 0.2 and 50 mPa·s at a temperature of 20° C. and a pressure of $1.01325 \times 10^5$ Pa. The dynamic viscosity at a temperature of 20° C. and a pressure of $1.01325 \times 10^5$ Pa of the siloxane hydrogen carrier compounds of formula (I) and of formula (II) can be measured according to any appropriate method; for example, it can be determined according to the ISO 1628-1 norm.

In an embodiment according to the present invention, the molecular weight of the liquid cyclic siloxane hydrogen carrier compounds of formula (II) may range from 130 to 800 g/mol. The molecular weight of the siloxane hydrogen carrier compounds of formula (II) can be measured according to any appropriate method; for example, it can be determined by GC-MS, e.g. a GC-MS analysis performed on an Agilent GC/MSD 5975C apparatus. In an embodiment according to the present invention, the number average molecular weight ($M_n$) and/or the molecular weight distribution (D) of the liquid linear siloxane hydrogen carrier compounds of formula (I) may range from 64 to 30 000 g/mol and from 1.1 to 50, respectively. The average molecular weight and the molecular weight distribution of the linear siloxane hydrogen carrier compounds of formula (I) can be measured according to any appropriate method; for example, it can be determined according to the ISO 16014 norm.

In an embodiment according to the present invention, the liquid cyclic siloxane hydrogen carrier compounds of formula (II) present a characteristic strong and sharp absorption band between 800 and 1000 $cm^{-1}$ corresponding to the $SiH_2$ units, when analysed by FT-IR. In an embodiment according to the present invention, the cyclic siloxane hydrogen carrier compounds of formula (II) present a characteristic strong and sharp absorption band between 850 and 950 $cm^{-1}$.

In an embodiment according to the present invention, the liquid cyclic siloxane hydrogen carrier compounds of formula (II) present a characteristic resonance between 4.5 and 4.9 ppm corresponding to the $SiH_2O$ units, when analysed by $^1H$ NMR in $CDCl_3$ at 25° C. $^1H$ NMR analyses can be performed on any appropriate spectrometer, e.g. a 400 MHz Bruker spectrometer.

In an embodiment according to the present invention, the liquid cyclic siloxane hydrogen carrier compounds of formula (II) present a characteristic resonance between −45 and −50 ppm corresponding to the $SiH_2O$ units, when analysed by $^{29}Si$ NMR in $CDCl_3$ at 25° C. $^{29}Si$ NMR analyses can be performed on any appropriate spectrometer, e.g. a 400 MHz Bruker spectrometer.

Figure 3:
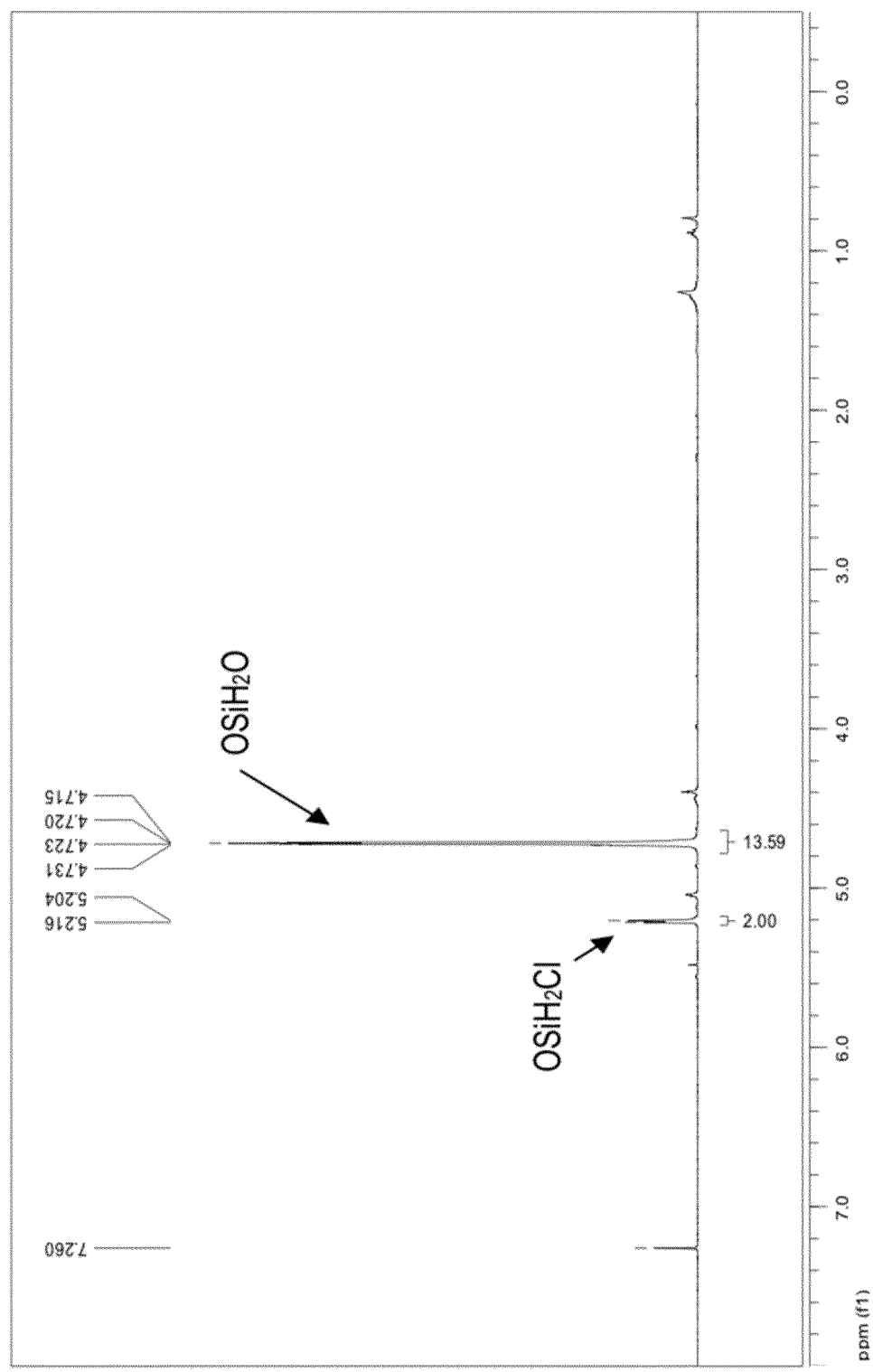
FIG. 3 illustrates $^1H$ NMR spectrum of the $Cl-(H_2SiO)_x-SiH_2Cl$ species.

In an embodiment according to the present invention, the liquid linear siloxane hydrogen carrier compounds of formula $Cl-(H_2SiO)_x-SiH_2Cl$ present a characteristic resonance between 4.5 and 4.9 ppm and between 5.0 and 5.5 ppm corresponding to the $SiH_2O$ units and the $SiH_2Cl$ units, respectively, when analysed by $^1H$ NMR in $CDCl_3$ at 25° C. as exemplified in FIG. 3. $^1H$ NMR analyses can be performed on any appropriate spectrometer, e.g. a 400 MHz Bruker spectrometer.

Figure 4:
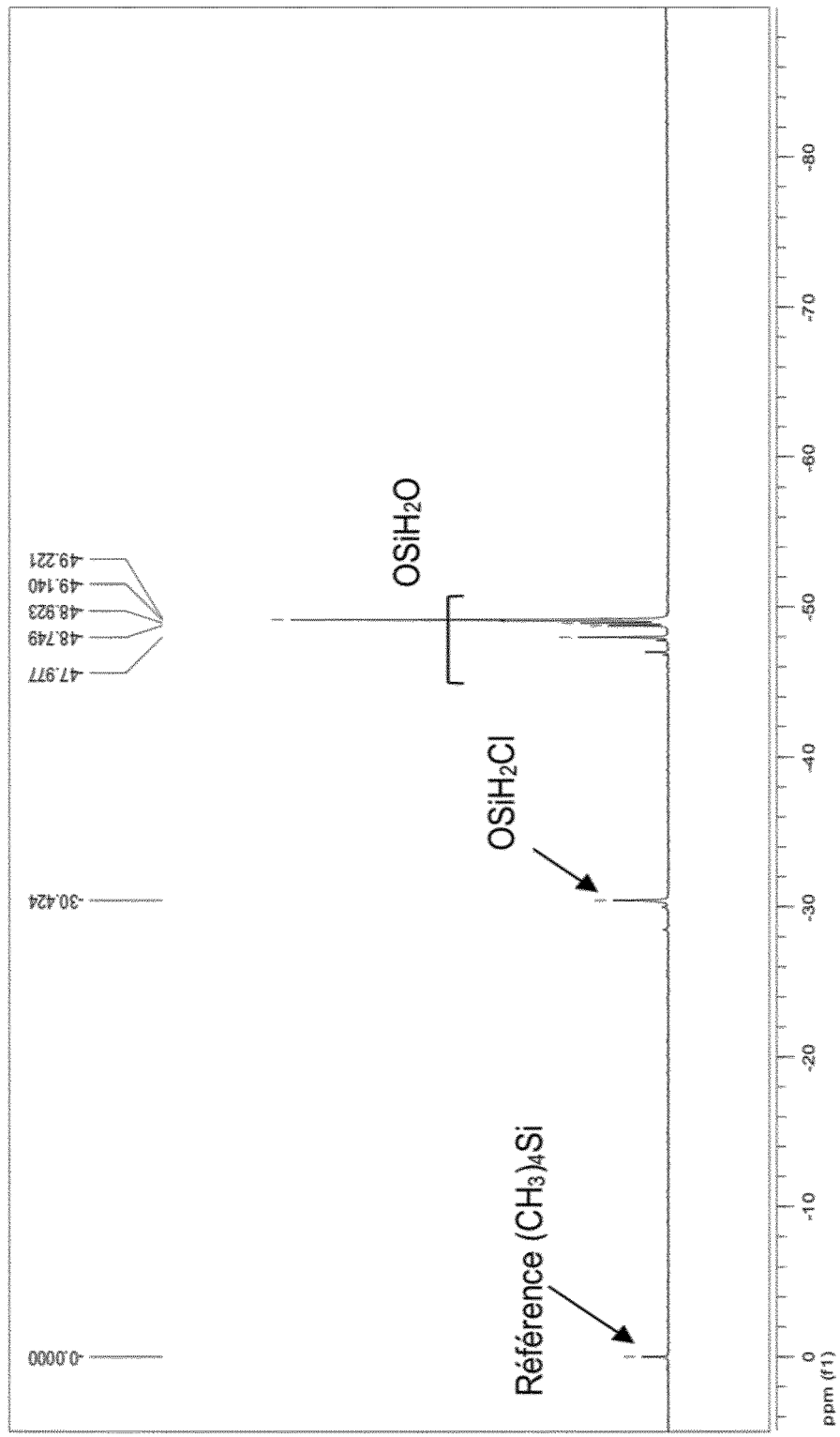
FIG. 4 illustrates $^{29}Si$ NMR spectrum of the $Cl-(H_2SiO)_x-SiH_2Cl$ species.

In an embodiment according to the present invention, the liquid linear siloxane hydrogen carrier compounds of formula $Cl-(H_2SiO)_x-SiH_2Cl$ present a characteristic resonance between −45 and −50 ppm and between −28 and −32 ppm corresponding to the $SiH_2O$ units and the $SiH_2Cl$ units, respectively, when analysed by $^{29}Si$ NMR in $CDCl_3$ at 25° C. as exemplified in FIG. 4. $^{29}Si$ NMR analyses can be performed on any appropriate spectrometer, e.g. a 400 MHz Bruker spectrometer.

In an embodiment according to the present invention, the liquid siloxane hydrogen carrier compounds of formula (I) and of formula (II) present a refractive index between 1 and 2 at a temperature of 20° C. and at a wavelength of 589 nm. In an embodiment according to the present invention, the liquid siloxane hydrogen carrier compounds of formula (I) and of formula (II) present a refractive index between 1.2 and 1.5 at a temperature of 20° C. and at a wavelength of 589 nm. The refractive index of the siloxane hydrogen carrier compounds of formula (I) and of formula (II) can be measured according to any appropriate method; for example, it can be determined according to the ASTM D1218 norm.

In an embodiment according to the present invention, the liquid siloxane hydrogen carrier compounds of formula (I) and of formula (II) present a boiling point between 30° C. and 500° C., for example between 50° C. and 500° C., at a pressure of $1.01325 \times 10^5$ Pa, for example a boiling point comprised between 50° C. and 250° C. The boiling point of the liquid siloxane hydrogen carrier compounds of formula (I) and of formula (II) can be measured according to any appropriate method; for example, it can be determined according to the ISO 918 norm.

In an embodiment according to the present invention, the liquid siloxane hydrogen carrier compounds of formula (I) and of formula (II) present a flash point between 30° C. and 500° C., for example between 50° C. and 500° C. The flash point of the siloxane hydrogen carrier compounds of formula (I) and of formula (II) can be measured according to any appropriate method; for example, it can be determined according to the ISO 3679 norm.

In an embodiment according to the present invention, the liquid siloxane hydrogen carrier compounds of formula (I) In an embodiment according to the present invention, the liquid cyclic siloxane hydrogen carrier compounds used in our claimed blends consist in any mixture of two or more of the said liquid cyclic siloxane compounds of formula (II).

According to the present invention, the siloxane hydrogen carrier compounds of formula (II) are liquid (at normal temperature and pressure (NTP); e.g. at a temperature of 20° C. and an absolute pressure of $1.01325 \times 10^5$ Pa).

In an embodiment according to the present invention, the siloxane hydrogen carrier compounds of formula (II) are selected amongst the following cyclic siloxane compounds, or consist in any mixture of two or more of the following cyclic siloxane compounds:

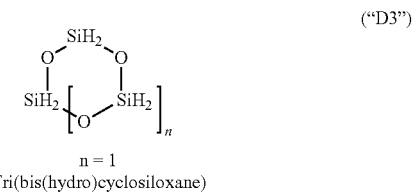

("D3")

n = 1
Tri(bis(hydro)cyclosiloxane)

7
-continued ("D4")

n = 2
Tetra(bis(hydro)cyclosiloxane)

n = 3
Penta(bis(hydro)cyclosiloxane)

n = 4
Hexa(bis(hydro)cyclosiloxane)

n = 5
Hepta(bis(hydro)cyclosiloxane)

n = 6
Octa(bis(hydro)cyclosiloxane)

n = 7
Nona(bis(hydro)cyclosiloxane)

n = 8
Deca(bis(hydro)cyclosiloxane)

n = 9
Undeca(bis(hydro)cyclosiloxane)

8
-continued n = 10
Duodeca(bis(hydro)cyclosiloxane) ("D12")

n = 11
Trideca(bis(hydro)cyclosiloxane) ("D13")

n = 12
Tetradeca(bis(hydro)cyclosiloxane) ("D14")

n = 13
Pendeca(bis(hydro)cyclosiloxane) ("D15")

n = 14
Hexadeca(bis(hydro)cyclosiloxane) ("D16")

n = 15
Heptadeca(bis(hydro)cyclosiloxane) ("D17")

In an embodiment, the present invention also relates to a hydrogen carrier compound reacting mixture comprising the claimed halogen terminated carbon-free liquid linear siloxane hydrogen carrier compounds (or the claimed blend) and water. For the purpose of the hydrogen production process according to the present invention, said water is considered as a reactant. Water can advantageously be selected from various sources such as for example fresh water, running water, tap water, salt water, deionized water and/or distilled water.

In an embodiment of the present invention, the said mixture of the siloxanes and water is characterised by a water/[SiOH$_2$] unit molar ratio which is superior or equal to 0.1. In an embodiment of the present invention, the said mixture of the siloxanes and water is characterised by a water/[SiOH$_2$] unit molar ratio which is comprised between 2 and 10, for example between 2 and 2.5.

For example, for a terminated carbon-free liquid linear siloxane hydrogen carrier compound Cl—(H$_2$SiO)$_x$—SiH$_2$Cl, the corresponding water/[SiOH$_2$] mixture will be characterised by a molar ratio value calculated as Ratio H$_2$O/[SiOH$_2$]=(m$_{H2O}$/M$_{H2O}$)/(m$_{[SiOH2]}$/M$_{[SiOH2]}$)=(m$_{H2O}$/

18)/($m_{[SiOH2]}$/46,11), wherein $m_{H2O}$ is the amount in g of water and $m_{[SiOH2]}$ is the amount in g of the siloxane compound. The same calculation applies for a blend of the claimed terminated carbon-free liquid linear siloxane hydrogen carrier compound together with the siloxane hydrogen carrier compounds of formula (II), in which case $m_{[SiOH2]}$ is the total amount in g of each of the siloxane compounds.

In an embodiment, the present invention also relates to a hydrogen carrier compound reacting mixture comprising the claimed halogen terminated carbon-free liquid linear siloxane hydrogen carrier compounds (or the claimed blend) and at least one hydrogen release initiator, and optionally and preferably water. For the purpose of the hydrogen production process according to the present invention, said hydrogen release initiator is considered as a reagent. There is no restriction regarding the type of hydrogen release initiator which can be used according to the present invention as long as it favours the hydrolytic oxidation of the siloxane hydrogen carrier compounds; and thus the siloxane reaction leading to the corresponding hydrogen release. For example, any compound which will favour the hydrolytic oxidation of the siloxane can advantageously be used as hydrogen release initiator.

In an embodiment according to the present invention, the hydrogen release initiator is selected amongst one or more compounds of the following list:
  a mineral base. For example, the mineral base can be an alkaline or alkaline-earth metal hydroxide such as potassium hydroxide or sodium hydroxide, the sodium hydroxide being particularly preferred;
  a compound able to release a nucleophile able to perform the hydrolytic oxidation of the siloxane hydrogen carrier compound such as, for example, a compound of formula RR'R''R'''ZY with Z being N or P, Y being OH, F, Cl or Br and R, R', R'' and R''' can be advantageously selected amongst $C_1$-$C_{15}$ alkyl or $C_6$-$C_{10}$ aryl, with R, R', R'', R'''being the same of different;
  a protic acid. For example, the protic acid can be a mineral acid or an organic acid; e.g. hydrochloric acid, sulfuric acid, carboxylic acids (methanoic, ethanoic acid . . . ) etc . . . ;
  a homogeneous organometallic catalyst able to promote the hydrolytic oxidation of the siloxane hydrogen carrier compound such as, for example, organometallic complexes based on iron, ruthenium, rhenium, rhodium, copper, chromium, iridium, zinc, and/or tungsten, etc . . . ; and
  a heterogeneous catalyst able to promote the hydrolytic oxidation of the siloxane hydrogen carrier compound such as, for example, metal nanoparticles, [M/AlO(OH), M=Pd, Au, Rh, Ru, and Cu], Pd/C and/or any of the aforementioned metal preferably immobilized on an inorganic support.

In an embodiment of the present invention the hydrogen release initiator is selected amongst carbon-free hydrogen release initiator, e.g. sodium hydroxide.

In an embodiment, the present invention also relates to a hydrogen carrier compound reacting mixture comprising the claimed halogen terminated carbon-free liquid linear siloxane hydrogen carrier compounds (or the claimed blend) and a catalyst C, and optionally and preferably a hydrogen release initiator as defined above and, optionally and preferably water. For the purpose of the hydrogen production process according to the present invention, said catalyst C is considered as a reagent. There is no restriction regarding the type of catalyst C which can be used according to the present invention as long as it increases the kinetic (i.e. the speed at which the hydrogen is released) of the hydrolytic oxidation of the siloxane hydrogen carrier compounds; and thus the water/siloxane/hydrogen release initiator/catalyst C reaction leading to the corresponding hydrogen release. For example, any compound which will significantly increase the kinetic of the hydrolytic oxidation of the siloxane can advantageously be used as catalyst C.

In an embodiment according to the present invention, the catalyst C is selected amongst one or more compounds of the following list:
  a phosphorous based catalyst (for example a polymer-supported catalyst bearing one or more phosphorous groups);
  an amine based catalyst (for example a polymer-supported catalyst bearing one or more amine groups), or an ammonium salt, for example RR'R''R'''NOH with R, R', R'', R'''being a $C_1$-$C_{15}$ alkyl or a $C_6$-$C_{10}$ aryl, and R, R', R'', R'''being the same of different;
  fluoride ions source catalyst (for example tetrabutylammonium fluoride); and
  hexamethylphosphoramide ("HMPA")
  a catalyst Y which is selected from formula

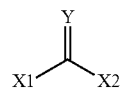

Wherein Y is O or S, and
X1, X2, are each independently selected from halogen, C1-C10 alkyl, C3-C10 cycloalkyl, C6-C12 aryl, C6-C12 aralkyl, 5 to 10-membered heteroaryl, $OR^3$, $SiR^6R^7R^8$, wherein said alkyl and aryl groups are optionally substituted by one to three $R^9$ groups
Or
X1 and X2=—$CR^aR^b$ form together with the carbon atom to which they are attached a 3 to 10-membered cycloalkyl, optionally substituted by one to three $R^9$ groups and $R^a$, $R^b$ are each independently selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups
Or
X1 and X2=$NR^aR^b$ with $R^a$ and $R^b$, each independently selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups
Or
X1 is selected from halogen, C1-C10 alkyl, C3-C10 cycloalkyl, C6-C12 aryl, C6-C12 aralkyl, 5 to 10-membered heteroaryl, $OR^3$, $SiR^6R^7R^8$ and X2=$NR^aR^b$ with $R^a$ and $R^b$, each independently selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups
Or
X1 and X2=$NR^c$ form together with the carbon atom to which they are attached a 3 to 10-membered heterocycloalkyl, optionally substituted by one to three $R^9$ groups and $R^c$ is selected from H, halogen, C1-C10 alkyl, C3-C10 cycloalkyl, C6-C12 aryl, C6-C12 aralkyl, 5 to 10-membered heteroaryl, $OR^{10}$, wherein said alkyl and aryl groups are optionally substituted by one to three $R^9$ groups Or $X1=-CR^aR^b$ with $R^a$, $R^b$ are each independently selected from H, halogen, C1-C10 alkyl, C3-C10 cycloalkyl, C6-C12 aryl, C6-C12 aralkyl, 5 to 10-membered heteroaryl, $OR^{10}$ and $X2=NR^c$ form together with the carbon atom to which they are attached a 3 to 10-membered heterocycloalkyl, optionally substituted by one to three $R^9$ groups with $R^c$ selected from H, halogen, C1-C10 alkyl, C3-C10 cycloalkyl, C6-C12 aryl, aralkyl, 5 to 10-membered heteroaryl, $OR^{10}$, wherein said alkyl and aryl groups are optionally substituted by one to three $R^9$ groups wherein $R^3$ is H, C1-C6 alkyl, C6-C10 aryl, C6-C12 aralkyl;

$R^6$, $R^7$, $R^8$ are each independently selected from H, $OR^3$, C1-C6 alkyl, C6-C10 aryl, C6-C12 aralkyl;

$R^9$ is selected from halogen, C1-C10 alkyl, C3-C10 cycloalkyl, C6-C12 aryl, C6-C12 aralkyl, 5 to 10-membered heteroaryl, $OR^{10}$, $NO_2$, $NR^{11}R^{12}$, CN, $C(=O)R^{10}$, $C(=O)OR^{10}$, $S(=O)CH_3$, wherein said alkyl and aryl groups are optionally substituted by one or more halogen or C1-C10 alkyl or $OR^3$;

$R^{10}$ is H, C1-C6 alkyl, C6-C10 aryl, C6-C12 aralkyl; and $R^{11}$, $R^{12}$ are each independently selected from H, or C1-C10 alkyl.

In an embodiment of the present invention, the said mixture of siloxanes, water and hydrogen release initiator and catalyst C is characterised by a hydrogen release initiator/[$SiOH_2$] unit molar ratio which is superior or equal to 0.01. In an embodiment of the present invention, the said mixture of siloxanes, water and hydrogen release initiator is characterised by a hydrogen release initiator/[$SiOH_2$] unit molar ratio which is comprised between 0.05 and 3, for example between 0.05 and 0.35.

In an embodiment of the present invention, the said mixture of siloxanes, water, hydrogen release initiator and catalyst C is characterised by a molar ratio of the catalyst relative to the [$SiOH_2$] monomer units in compound (I) which ranges from 0.01 to 0.5. Preferably the molar ratio of the catalyst C relative to the [$SiOH_2$] monomer units in compound (I) ranges from 0.02 to 0.1. More preferably the molar ratio of the catalyst C relative to the [$SiOH_2$] monomer units in compound (I) is lower than 0.05, e.g equal to 0.04.

For the purpose of the above calculations of the initiator and catalyst C to [$SiOH_2$] unit molar ratios, when the chosen compound falls at the same time under the hydrogen release initiator definition and the catalyst C definition, it is its total amount which is used for both ratios.

In another embodiment of the present invention, it has also been discovered that the claimed halogen terminated carbon-free liquid linear siloxane hydrogen carrier compounds (and also the cyclic siloxane compounds of formula (II)) can be produced from silica compound and/or silicate compound without requiring carbon containing reactant and/or without substantial carbon emissions, preferably without carbon emissions.

The silica compound according to the present invention can be defined as a silica containing compound, and/or a mixture of two or more of said silica containing compounds.

In an embodiment according to the present invention, the silica compound is selected from:

a silica compound of generic formula $SiO_2 \cdot xH_2O$, $[SiO_2]_n$ with n superior or equal to 2, or a mixture of two or more of said silica compounds.

The silicate compound according to the present invention can be defined as a silicate containing compound, and/or a mixture of two or more of said silicate containing compounds.

In an embodiment according to the present invention, the silicate compound is selected from:

a sodium or potassium silicate compound of generic formula $Na_{2x}SiO_{2+x}$ or $K_{2x}SiO_{2+x}$ with x being an integer comprised between 0 and 2, or a silicic acid compound of generic formula $[SiO_x(OH)_{4-x}]^{x-}$ with x being an integer comprised between 0 and 4 or of generic formula $[SiO_x(OH)_{4-2x}]_n$ with when n=1, x=0 or 1 and when n=2, x=1/2 or 3/2, or a silicate compound with a polymeric structure such as a disilicate ion of structure $(Si_2O_7)^{6-}$ or a macroanion of generic structure $[SiO_3^{2-}]_n$, $[Si_4O_{11}^{6-}]_n$ or $[Si_2O_5^{2-}]_n$ with n superior or equal to 2, or a mixture of two or more of said silicate compounds.

It has also been discovered that the claimed halogen terminated carbon-free liquid linear siloxane hydrogen carrier compounds (and also the cyclic siloxane compounds of formula (II)) can be regenerated without requiring carbon containing reactant and/or without substantial carbon emissions, preferably without carbon emissions.

The most important advantages of the production/regeneration processes of the present invention consist in the possibility to apply it continuously; such continuous process can also, as explained hereafter, be operated without requiring raw materials input and/or without by-product emissions.

It has also been discovered that by using the claimed halogen terminated carbon-free liquid linear siloxane hydrogen carrier compounds (and also the claimed blends), hydrogen could be produced in large amounts, with high yields, in a very short time and with very low production costs, without energy input to release it; and it was possible to generate said siloxane hydrogen carrier compounds without substantial carbon emissions, preferably without carbon emissions, by storing energy and recycling the by-products issued from the hydrogen production; and it was possible to store the said siloxane hydrogen carrier compounds at room temperature for several weeks, preferably several months, without any loss of their hydrogen content or any noticeable degradation of their physical aspect and chemical properties.

The term "hydrogen carrier compound" can be understood as a chemical compound able to store hydrogen, transport hydrogen and release hydrogen on demand; the characteristic of the hydrogen carrier compounds according to the present invention is that they can store/transport/release hydrogen without requiring any energy input (e.g. heat, electrical power etc. . . . ).

Process for Producing Liquid Siloxane Hydrogen Carrier Compounds

The present invention relates to a process for producing the claimed liquid siloxane hydrogen carrier compounds from silica compound and/or silicate compound without requiring carbon containing reactant and/or without substantial carbon emissions, preferably without carbon emissions.

Although the silica and/or silicate compound (B) as defined hereunder is a preferred source for the starting material for the process for producing liquid siloxane hydrogen carrier compounds according to the present invention, silica and/or other silicate containing minerals such as e.g. zircon, jade, mica, quartz, cristobalite, sand etc. . . . can advantageously be used as source of starting material for the process for producing liquid siloxane hydrogen carrier compounds. For the purposes of the present invention and appended claims, the silica and/or silicate compound (B) is preferably a silica compound and/or a silicate compound produced from the hydrolytic oxidation of the siloxane hydrogen carrier compound(s).

Process for Regenerating Siloxane Hydrogen Carrier Compounds

The present invention also relates to a process for regenerating the claimed liquid siloxane hydrogen carrier compounds, said process comprising the step of hydrolytic oxidation of the siloxane hydrogen carrier compounds for the production of hydrogen and silica and/or silicate compound (B), and the step of conversion of said silica and/or silicate compound (B) into the liquid siloxane hydrogen carrier compounds, said process not requiring carbon containing reactant and/or without substantial carbon emissions, preferably without carbon emissions.

The production and regeneration of the claimed liquid siloxane hydrogen carrier compounds according to the present invention is further detailed and explained in the following description. Having managed to develop corresponding processes not requiring carbon containing reactant and/or without substantial carbon emissions, preferably without carbon emissions represents a breakthrough in the field of hydrogen energy, hydrogen transport and hydrogen for the automotive industry.

Hydrogen Production

The present invention also relates to a method for the production of hydrogen by hydrolytic oxidation of siloxanes in the presence of water wherein the siloxanes are the liquid siloxane hydrogen carrier compounds which are selected amongst the claimed liquid siloxanes already defined hereinabove, preferably the claimed blend of siloxanes as defined hereinabove.

In an embodiment of the hydrogen production method according to the present invention, the blend preferably consists in a mixture exhibiting a molar ratio of the cyclic siloxanes of formula (II) relative to the claimed halogen terminated carbon-free liquid linear siloxane hydrogen carrier compounds to which ranges from 0.001 to 1, preferably from 0.01 to 0.25, more preferably from 0.01 to 0.1, for example lower than 0.05.

In an embodiment of the hydrogen production method according to the present invention, the blend preferably consists in a mixture exhibiting a molar ratio of the claimed halogen terminated carbon-free liquid linear siloxane hydrogen carrier compounds relative to the cyclic siloxanes of formula (II) which ranges from 0.001 to 1, preferably from 0.01 to 0.25, more preferably from 0.01 to 0.1, for example lower than 0.05.

In an embodiment of the hydrogen production method according to the present invention, the blend tolerates the presence of a solvent; any solvent can be used for example diethylether, tetrahydrofuran, methyltetrahydrofuran, cyclohexane, methylcyclohexane, dichloromethane, pentane, heptane, toluene, decahydronaphtalene; pentane and dichloromethane being particularly preferred.

In an embodiment of the hydrogen production method according to the present invention, when cyclic siloxane hydrogen carrier compounds of formula (II) represent the main species in substance amount (in mol) in the blend (i.e. represent a molar percentage of the cyclic siloxanes of formula (II) relative to the claimed halogen terminated carbon-free liquid linear siloxane hydrogen carrier compounds of formula (I) higher than 50 mole percent), and that the weight percentage of solvent in the blend is lower than 45 weight percent, it is advantageous to maintain a molar percentage of the claimed halogen terminated carbon-free liquid linear siloxane hydrogen carrier compounds of formula (I) relative to the cyclic siloxanes of formula (II) higher than 0.005 molar percent, preferably higher than 1.0 mol percent, more preferably higher than 2.0 mol percent.

In an embodiment of the hydrogen production method according to the present invention, when cyclic siloxane hydrogen carrier compounds of formula (II) represent the main species in substance amount (in mol) in the blend (i.e. represent a molar percentage of the cyclic siloxanes of formula (II) relative to the claimed halogen terminated carbon-free liquid linear siloxane hydrogen carrier compounds of formula (I) higher than 50 mole percent), and that the weight percentage of solvent in the blend is lower than 25 weight percent, it is advantageous to maintain a molar ratio of the claimed halogen terminated carbon-free liquid linear siloxane hydrogen carrier compounds of formula (I) relative to the cyclic siloxanes of formula (II) higher than 0.005 mol percent, preferably higher than 2.0 mol percent, more preferably higher than 5.0 mol percent.

In an embodiment of the hydrogen production method according to the present invention, when linear siloxane hydrogen carrier compounds of formula (I) represent the main species in substance amount (in mol) in the blend (i.e. represent a molar percentage of the claimed halogen terminated carbon-free liquid linear siloxane hydrogen carrier compounds of formula (I) relative to the cyclic siloxane hydrogen carrier compounds of formula (II) higher than 50 mole percent), it is advantageous to restrict the weight percentage of solvent in the blend to a value lower than 20 weight percent, preferably lower than 10 weight percent in the blend; in an embodiment, less than 5 weight percent, or even less than 2 weight percent.

In an embodiment according to the present invention, the claimed liquid siloxane hydrogen carrier compounds of formula (I) consist in a mixture of two or more of the said liquid linear siloxane compounds of formula (I); said mixture preferably comprises at least 50 mol % of compounds of formula (I) wherein n is comprised between 10 and 30 (i.e. having between 10 and 30 repeating units of $H_2SiO$) relative to the sum of the moles of siloxane hydrogen carrier compounds of formula (I) in the mixture, for example more than 80 mol %.

In an embodiment according to the present invention, the method for the production of hydrogen is characterised in that the water/[$SiOH_2$] unit molar ratio is superior or equal to 0.1. In an embodiment of the present invention, the said mixture of the siloxanes and water is characterised by a water/[$SiOH_2$] unit molar ratio which is comprised between 2 and 10, for example between 2 and 2.5.

In an embodiment of the present invention, the method for the production of hydrogen is characterised in the presence of at least one hydrogen release initiator during the hydrolytic oxidation of siloxanes in the presence of water. There is no restriction regarding the type of hydrogen release initiator which can be used according to the present invention as long as it favours the hydrolytic oxidation of the siloxane hydrogen carrier compounds of formula (I); and thus the water/siloxane reaction leading to the corresponding hydrogen release. For example, any compound which will favour the hydrolytic oxidation of the siloxane can advantageously be used as hydrogen release initiator; useful hydrogen release initiators have already been defined hereinabove. In an embodiment of the present invention, the said mixture of siloxanes, water and hydrogen release initiator and optional catalyst C is characterised by a hydrogen release initiator/[SiOH$_2$] unit molar ratio which is superior or equal to 0.01. In an embodiment of the present invention, the said mixture of siloxanes, water and hydrogen release initiator is characterised by a hydrogen release initiator/[SiOH$_2$] unit molar ratio which is comprised between 0.05 and 3, for example between 0.05 and 0.35.

In an embodiment of the present invention, the method for the production of hydrogen is characterised in the presence of a mixture of the siloxane hydrogen carrier compounds of formula (I), water, a hydrogen release initiator as defined above and a catalyst C. There is no restriction regarding the type of catalyst C which can be used according to the present invention as long as it increases the kinetic (i.e. the speed at which the hydrogen is released) of the hydrolytic oxidation of the siloxane hydrogen carrier compounds of formula (I); and thus the water/siloxane/hydrogen release initiator/catalyst C reaction leading to the corresponding hydrogen release. For example, any compound which will significantly increase the kinetic of the hydrolytic oxidation of the siloxane can advantageously be used as catalyst C; useful catalysts C have already been defined hereinabove. In an embodiment of the present invention, the said mixture of siloxanes, water, hydrogen release initiator and catalyst C is characterised by a molar ratio of the catalyst relative to the [SiOH$_2$] monomer units in compound (I) which ranges from 0.01 to 0.5. Preferably the molar ratio of the catalyst C relative to the [SiOH$_2$] monomer units in compound (I) ranges from 0.02 to 0.1. More preferably the molar ratio of the catalyst C relative to the [SiOH$_2$] monomer units in compound (I) is lower than 0.05, e.g equal to 0.04.

There is no restriction regarding the methods which can be used for the hydrogen production method according to the present invention as long as the hydrogen release from the claimed hydrogen carrier compounds may not require additional energy and satisfies the hydrogen industry requirements.

In an embodiment according to the present invention, the temperature of the method for the production of hydrogen from the claimed siloxane hydrogen carrier compounds may vary in a wide range, and may range notably from 0° C. to 200° C. More preferably, the temperature ranges from 15° C. to 30° C.

In an embodiment according to the present invention, the pressure of the method for the production of hydrogen from the claimed siloxane hydrogen carrier compounds may vary in a wide range, and may range notably from $1 \times 10^5$ Pa to $500 \times 10^5$ Pa.

In an embodiment according to the present invention, the method for the production of hydrogen from the claimed siloxane hydrogen carrier compounds can tolerate the presence of a solvent. There is no restriction regarding the type of solvent which can be used for the hydrogen production method according to the present invention as long as the hydrogen release from the claimed hydrogen carrier compounds satisfies the hydrogen industry requirements. In an embodiment according to the present invention, said solvent is selected from alcohol (e.g. methanol), aqueous solvents, organic solvents and/or a mixture of two or more of said solvents. For the purpose of the hydrogen production process according to the present invention, said solvent is considered as a reagent.

In an embodiment according to the present invention, the method for the production of hydrogen from the claimed siloxane hydrogen carrier compounds comprises the following steps: a) contacting the claimed halogen terminated carbon-free liquid linear siloxane hydrogen carrier compounds (or a blend thereof together with the cyclic siloxane hydrogen carrier compounds of formula (II) and an optional catalyst C to form a siloxane/catalyst mixture and: b) combining the siloxane with an aqueous solution of the hydrogen release initiator, in the presence of said optional catalyst C, to produce hydrogen. Steps a) and b) may occur consecutively or simultaneously.

In an embodiment according to the present invention, the reaction mixture used in the method for the production of hydrogen from siloxane hydrogen carrier compounds is characterised in that
  the claimed halogen terminated carbon-free liquid linear siloxane hydrogen carrier compounds,
  the cyclic siloxane hydrogen carrier compounds of formula (II),
  the corresponding silicate-type by-products,
  hydrogen,
  the water,
  the hydrogen release initiator(s), and
  the optional catalyst C, and
  the optional solvents
  represent at least 90 percent by weight of the said reaction mixture, preferably at least 95 percent by weight, for example at least 99 percent by weight.

In an embodiment, the present invention also relates to a device for producing hydrogen according to the method hereabove described, said device comprising a reaction chamber comprising:
  a reaction mixture inlet, said mixture comprising the siloxane hydrogen carrier compounds of formula (I) and an optional solvent;
  an hydrogen outlet;
  optionally a by-product collector; and
  optionally a surface intended to be in contact with said mixture, coated with a polymer supported catalyst as described hereabove.

Liquid Siloxane Production and Liquid Siloxane Regeneration

As explained hereinabove, the objectives of the present invention are also to produce the claimed halogen terminated carbon-free liquid linear siloxane hydrogen carrier compounds and to regenerate them by recycling the by-products issued from the hydrogen production, environmentally friendly and/or without substantial carbon emissions, preferably without carbon emissions.

Thus, the present invention relates to a process for producing the claimed halogen terminated carbon-free liquid linear siloxane hydrogen carrier compounds from silica compound and/or silicate compound, preferably from silica and/or silicate compound (B), without requiring carbon containing reactant and/or without substantial carbon emissions, preferably without carbon emissions.

The present invention also relates to a process for regenerating the claimed halogen terminated carbon-free liquid linear siloxane hydrogen carrier compounds, said process comprising the step of hydrolytic oxidation of the claimed halogen terminated carbon-free liquid linear siloxane hydrogen carrier compounds for the production of hydrogen and silica and/or silicate compound(s) (B), and the steps of conversion of said silica and/or silicate compound(s) (B) into the claimed halogen terminated carbon-free liquid linear siloxane hydrogen carrier compounds, preferably the same claimed halogen terminated carbon-free liquid linear siloxane hydrogen carrier compounds, said process not requiring carbon containing reactant and/or without substantial carbon emissions, preferably without carbon emissions.

In an embodiment according to the present invention, there is provided a process for the production of the halogen terminated carbon-free liquid linear siloxane hydrogen carrier compound(s) consisting in reaction routes Y or Z comprising the following consecutive steps:
providing silica compound and/or silicate compound,
for reaction route Y,
subjecting the silica compound and/or silicate compound to a reduction step to produce silicon;
for reaction route Z,
subjecting the silica compound and/or silicate compound to a halogenation step to produce silicon tetrahalide, and
subjecting the silicon tetrahalide to a reduction step to produce silicon;
for reaction routes Y and Z,
subjecting silicon to a hydrohalogenation step to produce halosilane, and
subjecting the halosilane to a hydrolysis step to produce the halogen terminated carbon-free liquid linear siloxane hydrogen carrier compound(s).

Silicate/Silica.

In an embodiment to the present invention, i.e. when a silicate is selected as starting material of the siloxane production/regeneration process, an additional treatment (e.g. solvent evaporation, chemical treatment by an acid, pyrolysis . . . ) of the silicate could advantageously be used to obtain silica ($SiO_2$), the latter being used as the raw material of the siloxane process.

In an embodiment to the present invention, the silica and/or the silicate compound could be subjected to an additional mechanical treatment, e.g. grinding and/or sieving, prior to be subjected to the reduction step of reaction route Y and/or prior to be subjected to the halogenation step of reaction route Z.

In an embodiment to the present invention pertaining to reaction route Y, its initial step of subjecting the silica compound and/or silicate compound to a reduction step to produce silicon can be performed in one or two steps; for example, a one-step reduction process or a two-steps reduction process with intermediate production of SiO.

For the purpose of the present description and appended claims, the following numbering has been used for the individual reaction steps:
for reaction route Z,
halogenation of the silica and/or silicate compound for the production of silicon tetrahalide corresponds to step 2(a); any suitable halide source can be used for step 2(a) as long as it favours the production of silicon tetrahalide;
Steps 3(a') and/or Step 3(b) corresponds to the reduction of the silicon tetrahalide to produce silicon;
for reaction route Y,
Step 2(c) corresponds to the one-step reduction of the silica compound and/or silicate compound to produce silicon;
Steps 2(b) and 3(c) correspond to the two-steps reduction of the silica compound and/or silicate compound to produce silicon;
for reaction routes Y and Z,
Step 4 corresponds to the hydrohalogenation process of silicon to produce halosilane;
Step 5 corresponds to the hydrolysis of the halosilane to produce the halogen terminated carbon-free liquid linear siloxane hydrogen carrier compound(s).

For illustrative and non-limiting purposes, an example of the siloxane production process is detailed in FIG. 1, and FIG. 2 illustrates examples of the individual process steps;
In FIG. 2, step 3(b), in the case where Na is used as reducing agent (step 3(b)), the formed 4 equivalents of NaF are recycled to regenerate 4 Na and 4 HF in a process which is not disclosed here.
In FIG. 2, step 3(c), in the case where the hydrogen gas reduction of SiO route is employed (step 3(c)), 2 equivalents of Si are formed. One equivalent of the latter can advantageously be reinjected in the step 2(b) in order to avoid any input of Si into the process and the other equivalent (the "excess" content) is advantageously consumed in the next step 4 of the process.
In FIG. 2, step 4 of the production process is a multistage process which is not fully disclosed here.

In an embodiment according to the present invention, there is provided a process for the regeneration of halogen terminated carbon-free liquid linear siloxane hydrogen carrier compound(s) comprising the hydrolytic oxidation of halogen terminated carbon-free liquid linear siloxane hydrogen carrier compound(s) for the production of hydrogen and silica and/or silicate compound (B) followed by reaction routes Y or Z comprising the following consecutive steps:
for reaction route Y,
subjecting the silica compound and/or silicate compound (B) to a reduction step to produce silicon,
subjecting silicon to a hydrohalogenation step to produce halosilane, and
subjecting the halosilane to a hydrolysis step to regenerate halogen terminated carbon-free liquid linear siloxane hydrogen carrier compound(s), preferably the same the halogen terminated carbon-free liquid linear siloxane hydrogen carrier compound(s);
for reaction route Z,
subjecting the silica compound and/or silicate compound (B) to a halogenation step to produce silicon tetrahalide,
subjecting the silicon tetrahalide to a reduction step to produce silicon,
subjecting silicon to a hydrohalogenation step to produce halosilane, and
subjecting the halosilane to a hydrolysis step to regenerate halogen terminated carbon-free liquid linear siloxane hydrogen carrier compound(s), preferably the same halogen terminated carbon-free liquid linear siloxane hydrogen carrier compound(s).

Said regenerated halogen terminated carbon-free liquid linear siloxane hydrogen carrier compound(s) can advantageously be used in the hydrogen production method according to the present invention which allows to re-start the cycle.

A tremendous advantage brought by the polydihydrosiloxane compounds according to the present invention as hydrogen-based energy carriers is that their complete hydrolysis during the hydrogen liberation process leads uniquely a silica/silicate compound(s) (B); said silica/silicate compound(s) (B) being a straightaway starting material for an environmentally friendly and/or without carbon emissions process, exhaustively exemplified and atom-economic regeneration process allowing to recover the exact starting fuel oil.

Step 2(a)—Halogenation of Silica/Silicate-Type Products (Reaction Route Z)

In an embodiment according to the present invention, there is provided a method for the halogenation of the silica/silicate compound (B) by an halide source for the production of silicon tetrahalide compound. Any halide source can advantageously be used. Hydrogen halide is a preferred halide source; said hydrogen halide can advantageously be an aqueous solution or a gas, for example hydrogen fluoride (HF). For example, when hydrogen fluoride is used for the halogenation step, silicon tetrafluoride and water as by-product are formed; the water can be collected in order to be reused in a further step of the process or electrolysed, forming hydrogen and oxygen gas, the former being e.g. directly consumed by the next step of the process.

Step 2(b)—Reduction of Silica/Silicate Type Products to Form SiO (Reaction Route Y—First Step of the Two-Steps Reduction)

In an embodiment according to the present invention, there is provided a method for the reduction of the silica/silicate compound (B) in the presence of elemental silicon for the production of SiO. Any source of elemental silicon can advantageously be used. Metallurgical grade silicon is a preferred elemental silicon source. Since elemental silicon is used for the reduction step, two equivalents of SiO are formed per transformed silicate; the formed SiO being e.g. directly consumed by the step 3(c) of the process. An example of process of Si production from silica/silicate compound (B) symbolized in this case as silica ($SiO_2$) which is a combination of steps 2(b) and 3(c) can be found in FIG. 1.

Step 2(c)—Reduction of Silica/Silicate Type Products to Form Si (Reaction Route Y—One-Step Reduction)

In an embodiment according to the present invention, there is provided a method for the reduction of the silica/silicate compound (B) in the presence of hydrogen gas for the production of elemental silicon. The elemental silicon produced can be either metallurgical or photovoltaic grade. Other gas(es) can optionally be employed in addition to hydrogen, e.g. an inert gas such as argon or nitrogen. Since the reaction of reduction of silica/silicate compounds by hydrogen is endothermic, a heat source is required; any source of heat can be selected, e.g. electric arc technology, induction heating, microwave, hot filament, plasma technology. Plasma is particularly preferred; for example, a corresponding plasma technology can advantageously comprise a plasma torch allowing to create a plasma jet. The plasma jet is preferably made from hydrogen gas, with or without additional gas(es) (such as, for example, argon), going through electrodes. Silica can be introduced into the hydrogen plasma jet under vacuum prior to react in the gas phase with hydrogen at a temperature comprised between 2000 and 20 000° K to form silicon and water. Silicon is then condensed and recovered as a solid.

The reduction reaction of silica/silicate compounds by hydrogen gas produces water as by-product. The formed water can advantageously be used as chemical reactant, and/or as heating source for other utilities and/or can be transformed in an electrolyser to reform hydrogen gas and/or can be used to run a steam turbine to produce electricity.

Step 3(a')—Reduction of the Silicon Tetrahalide

In an embodiment according to the present invention, there is provided a method for the reduction of the silicon tetrahalide compound by hydrogen gas (e.g. the hydrogen formed by electrolysis of water collected from the previous step; or hydrogen recovered from another step of the process; or from fatal hydrogen collected from an external process) for the production of elemental silicon [step 3(a')]. In the case where silicon tetrafluoride ($SiF_4$) is used as silicon tetrahalide source, the reduction step employing hydrogen gas can lead to elemental silicon and release hydrogen fluoride (HF) as by-product [step 3(a')]. Said formed HF can advantageously be reinjected in the above halogenation step [step 2(a)] leading to an equilibrated material balance over the steps (2) and (3) of the production/regeneration process.

Step 3(b)—Reduction of the Silicon Tetrahalide Compound

In an embodiment according to the present invention, there is provided a method for the reduction of the silicon tetrahalide compound by a metallic reductant for the production of elemental silicon. Alkaline metals can advantageously be selected as the metallic reductant, e.g. sodium. The reduction step employing an alkaline metal such as sodium can lead to elemental silicon and release sodium fluoride (NaF), the latter being advantageously recycled in a multistep process regenerating Na and HF. Said regenerated Na can advantageously be reused as reductant in the step 3(b) mentioned here leading to an equilibrated material balance. Said regenerated HF can advantageously be reused, for example in the step 2(a) of the process leading to an equilibrated material balance.

Step 3(c)—Reduction of SiO by Hydrogen Gas

In an embodiment according to the present invention, there is provided a method for the reduction of SiO by hydrogen gas for the production of elemental silicon. A part of the produced elemental silicon can advantageously be reinjected in the step 2(b) in order to avoid any input of elemental silicon in the process, the other part (in "excess") of the produced elemental silicon being directly consumed in the next hydrohalogenation step 4 of the process.

Step 4—Hydrohalogenation of the Elemental Silicon

In an embodiment according to the present invention, there is provided a method for the hydrohalogenation of the elemental silicon for the production of halosilanes, e.g. monohalosilane ($H_3SiX$), dihalosilane ($H_2SiX_2$), trihalosilane ($HSiX_3$) and/or tetrahalosilane ($SiX_4$), or a mixture of these compounds (X being a halide). Elemental silicon used in the hydrohalogenation step is preferably originating from the previous step of the process. Hydrogen chloride (HCl) is a preferred hydrogen halide source for the said hydrohalogenation of the elemental silicon into dichlorosilane ($H_2SiCl_2$) and/or trichlorosilane ($HSiCl_3$) and/or tetrachlorosilane ($SiCl_4$); said hydrogen chloride can advantageously be an aqueous solution or a gas. In the case where hydrogen chloride is used, a process can be designed in order to redistribute $HSiCl_3$, which is the main product of the silicon hydrochlorination reaction, through a catalysed dismutation reaction into a mixture of $H_3SiCl$, $H_2SiCl_2$, $HSiCl_3$ and $SiCl_4$. $SiCl_4$ can advantageously be recycled via reduction by hydrogen gas in the presence of elemental silicon into a mixture of $H_2SiCl_2$, $HSiCl_3$ and $SiCl_4$. Elemental silicon used in the $SiCl_4$ reduction step is preferably originating from the previous step of the process. Hydrogen gas used in the $SiCl_4$ reduction step can advantageously be a by-product of another step of the process, for e.g. from the elemental silicon hydrohalogenation step mentioned above. Several subsequent separation and purification steps may allow to isolate pure $H_2SiCl_2$ (or generically $H_2SiX_2$ with X being a halogen) which can be directly consumed in the next step (5) of the process. In an embodiment according to the present invention, the halosilanes ($H_2SiX_2$ reactant) are subjected to a step of condensation, preceding the addition of water, during which the temperature of the reacting medium is maintained between −50° C. and 0° C., preferably between −45° C. and −25° C.

Step 5—Controlled Hydrolysis of Halosilanes

In an embodiment according to the present invention, there is provided a method for the controlled hydrolysis of halosilanes by water to produce/regenerate the siloxane hydrogen carrier compounds. In the case where $H_2SiCl_2$ is used as halosilane source for the said controlled hydrolysis, HCl is formed as by-product. The formed HCl can advantageously be reinjected in the step 4 of the process. In the case where $H_2SiF_2$ is used as halosilane source for the said controlled hydrolysis, HF is formed as by-product. The formed HF can advantageously be reinjected in the step 2(a) of the process. Said hydrolysis can advantageously be performed under operating conditions characterised in that the $[H_2O/H_2SiX_2]$ molar ratio is inferior to 0.99, preferably inferior to 0.98; in an embodiment of the present invention, this ratio is superior to 0.2, preferably superior to 0.25, for example higher than 0.3. Said hydrolysis can advantageously be performed under controlled atmosphere, for example atmosphere of argon, nitrogen . . . Said hydrolysis can advantageously be performed in the presence of a solvent. Any solvent can be used, e.g. diethylether, tetrahydrofuran, methyltetrahydrofuran, cyclohexane, methylcyclohexane, dichloromethane, pentane, heptane, toluene, decahydronaphtalene; pentane and dichloromethane being particularly preferred. Said hydrolysis can advantageously be performed under operating conditions characterised in that the volume of solvent per weight of $H_2SiX_2$ is inferior to 10, preferably inferior to 8. Said hydrolysis can advantageously be performed under operating conditions characterised in that the speed of addition of water into the reacting medium is preferably higher than 0.05 mL/min. In an embodiment according to the present invention, this speed of addition of water into the reacting medium is higher than 0.05 mL of water per minute and per 20 g of $H_2SiX_2$, for example higher than 0.075 mL of water per minute and per 20 g of $H_2SiX_2$, more preferably superior or equal to 0.25 mL of water per minute and per 20 g of $H_2SiX_2$). For example, if the reacting medium comprises 1 kg of $H_2SiX_2$, the speed of addition of water into the reacting medium will be higher than 2.5 millilitres of water per minute, preferably higher than 3.75 millilitres of water per minute, most preferably higher than 12.5 millilitres of water per minute.

In an embodiment according to the present invention, this speed of addition of water into the reacting medium is less than 5.00 mL of water per minute and per 20 g of $H_2SiX_2$, for example less than 4.00 mL of water per minute and per 20 g of $H_2SiX_2$, more preferably less than 3.50 mL of water per minute and per 20 g of $H_2SiX_2$).

Said hydrolysis can advantageously be performed under operating conditions characterised in that the volume of solvent per weight of water is lower than 50 mL/g, preferably lower than 45 mL/g.

Said hydrolysis is exothermic. The temperature of the reacting medium is thus preferably maintained between −50° C. and +100° C., for example between −50° C. and +50° C., more preferably between −40° C. and 30° C. over the whole reaction duration.

During the step of the addition of water, the temperature of the reacting medium is preferably maintained between −50° C. and 0° C., more preferably between −45° C. and −25° C.

At the end of the addition of water, the reaction continues, and the reacting medium is allowed to warm to a temperature not exceeding 30° C. For example, the temperature of the reacting medium is allowed to warm from −30° C. to 20° C., over a certain period of time, for example over 1 h 30 minutes.

Said hydrolysis can advantageously be performed in the presence of a chain terminating agent, preferably a carbon-free chain terminating agent, e.g. $H_3SiCl$, $HSiCl_3$ . . . etc.

An illustrative example of an equation showing the chemical equilibrium occurring during the step 5 of the present invention is depicted hereafter

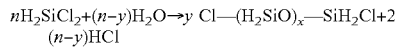

wherein n, y, z, x are integers, n being the number of $H_2SiCl_2$ molecules in the reacting medium, y the number of polymer chain of composition Cl—$(H_2SiO)_x$—$SiH_2Cl$ with x being the number of $(H_2SiO)$ repeating units.

Final treating steps can advantageously be performed such as washings with water, containing or not a mineral base, gas stripping, drying steps, quenching, distillation under reduced pressure etc. . . . .

In an embodiment according to the present invention, the liquid linear siloxane hydrogen carrier compound(s) are obtained by distillation under reduced pressure of the crude reaction mixture; the liquid linear siloxane hydrogen carrier compound(s) representing the heavy fraction.

In an embodiment according to the present invention, the energy consumption required by the overall siloxane hydrogen carrier of formula (I) production process may be comprised between 1 and 200 kWh/kg of produced siloxane, for example between 1 and 35 kWh/kg of produced siloxane.

In an embodiment according to the present invention, the energy consumption required by the overall siloxane hydrogen carrier of formula (I) regeneration process may be comprised between 1 and 2000 kWh/kg of liberated $H_2$, for example between 1 and 400 kWh/kg of liberated $H_2$.

In an embodiment according to the present invention, the energy consumption required by the step 2(a) of the siloxane hydrogen carrier of formula (I) production/regeneration process may be comprised between 1 and 50 kWh/kg of produced $SiF_4$.

In an embodiment according to the present invention, the temperature of the method for the production of $SiF_4$ in the step 2(a) of the siloxane hydrogen carrier of formula (I) production/regeneration process may vary in a wide range, and may range notably from 0° C. to 1000° C.

In an embodiment according to the present invention, the pressure of the method for the production of $SiF_4$ in the step 2(a) of the siloxane hydrogen carrier of formula (I) production/regeneration process may vary in a wide range, and may range notably from 1 to $1 \cdot 10^7$ Pa.

In an embodiment according to the present invention, the step 2(a) of the siloxane hydrogen carrier of formula (I) production/regeneration process is characterised in that the mixture of the hydrogen fluoride (HF)/silicate compound (B) molar ratio is superior or equal to 1. In an embodiment of the present invention, the said mixture of the HF and silicate compound (B) is characterised by a HF/(B) molar ratio which is comprised between 4 and 100.

In an embodiment according to the present invention, the number of unitary operations (e.g. reaction, separation, purification, etc. . . . ) required by the step 2(a) of the siloxane hydrogen carrier of formula (I) production/regeneration process may be comprised between 1 and 10.

In an embodiment according to the present invention, the energy consumption required by the step 2(b) of the siloxane hydrogen carrier of formula (I) production/regeneration process may be comprised between 1 and 50 kWh/kg of produced SiO.

In an embodiment according to the present invention, the temperature of the method for the production of SiO in the step 2(b) of the siloxane hydrogen carrier of formula (I) production/regeneration process may vary in a wide range, and may range notably from 1000° C. to 2000° C.

In an embodiment according to the present invention, the pressure of the method for the production of SiO in the step 2(b) of the siloxane hydrogen carrier of formula (I) production/regeneration process may vary in a wide range, and may range notably from 1 to $1 \cdot 10^7$ Pa. More preferably the pressure ranges from 100 to 10 000 Pa.

In an embodiment according to the present invention, the step 2(b) of the siloxane hydrogen carrier of formula (I) production process is characterised in that the mixture of the silicate compound (B)/Si molar ratio is superior or equal to 0.1. In an embodiment of the present invention, the said mixture of the silicate compound (B) and Si is characterised by a compound (B)/Si molar ratio which is comprised between 0.5 and 1.5. Preferably, the silicate compound (B)/Si molar ratio is 1.

In an embodiment according to the present invention, the number of unitary operations (e.g. reaction, separation, purification, etc. . . . ) required by the step 2(b) of the siloxane hydrogen carrier of formula (I) production/regeneration process may be comprised between 1 and 10.

In an embodiment according to the present invention, the energy consumption required by the step 2(c) of the siloxane hydrogen carrier of formula (I) production/regeneration process may be comprised between 1 and 50 kWh/kg of produced Si.

In an embodiment according to the present invention, the temperature of the method for the production of Si in the step 2(c) of the siloxane hydrogen carrier of formula (I) production/regeneration process may vary in a wide range, and may range notably from 30° C. to 6000° C.

In an embodiment according to the present invention, the pressure of the method for the production of Si in the step 2(c) of the siloxane hydrogen carrier of formula (I) production/regeneration process may vary in a wide range, and may range notably from 1 to $1 \cdot 10^7$ Pa. More preferably the pressure ranges from 10 to 10 000 Pa.

In an embodiment according to the present invention, the step 2(c) of the siloxane hydrogen carrier of formula (I) production/regeneration process is characterised in that the mixture of the $H_2$ gas/silicate compound (B) molar ratio is superior or equal to 0.1. In an embodiment of the present invention, the said mixture of the $H_2$ gas and silicate compound (B) is characterised by a $H_2$ gas/compound (B) molar ratio which is comprised between 2 and 100. Preferably, between 2 and 20.

In an embodiment according to the present invention, the number of unitary operations (e.g. reaction, separation, purification, etc. . . . ) required by the step 2(c) of the siloxane hydrogen carrier of formula (I) production/regeneration process may be comprised between 1 and 10.

In an embodiment according to the present invention, the energy consumption required by the step 3(a') of the siloxane hydrogen carrier of formula (I) production/regeneration process may be comprised between 1 and 50 kWh/kg of produced Si.

In an embodiment according to the present invention, the temperature of the method for the production of Si in the step 3(a') of the siloxane hydrogen carrier of formula (I) production/regeneration process may vary in a wide range, and may range notably from 30° C. to 6000° C.

In an embodiment according to the present invention, the pressure of the method for the production of Si in the step 3(a') of the siloxane hydrogen carrier of formula (I) production/regeneration process may vary in a wide range, and may range notably from 1 to $1 \cdot 10^7$ Pa.

In an embodiment according to the present invention, the step 3(a') of the siloxane hydrogen carrier of formula (I) production/regeneration process is characterised in that the mixture of the hydrogen gas ($H_2$)/SiF$_4$ molar ratio is superior or equal to 2. In an embodiment of the present invention, the said mixture of the $H_2$ and SiF$_4$ is characterised by a $H_2$/SiF$_4$ molar ratio which is comprised between 2 and 100.

In an embodiment according to the present invention, the energy consumption required by the step 3(b) of the siloxane hydrogen carrier of formula (I) production/regeneration process may be comprised between 1 and 50 kWh/kg of produced Si.

In an embodiment according to the present invention, the temperature of the method for the production of Si in the step 3(b) of the siloxane hydrogen carrier of formula (I) production/regeneration process may vary in a wide range, and may range notably from 100° C. to 1000° C.

In an embodiment according to the present invention, the pressure of the method for the production of Si in the step 3(b) of the siloxane hydrogen carrier of formula (I) production/regeneration process may vary in a wide range, and may range notably from 1 to $1 \cdot 10^7$ Pa.

In an embodiment according to the present invention, the step 3(b) of the siloxane hydrogen carrier of formula (I) production/regeneration process is characterised in that the mixture of sodium(Na)/SiF$_4$ molar ratio is superior or equal to 1. In an embodiment of the present invention, the said mixture of the Na and SiF$_4$ is characterised by a Na/SiF$_4$ molar ratio which is comprised between 4 and 100.

In an embodiment according to the present invention, the number of unitary operations (e.g. reaction, separation, purification, etc. . . . ) required by the step 3(b) of the siloxane hydrogen carrier of formula (I) production/regeneration process may be comprised between 1 and 10.

In an embodiment according to the present invention, the energy consumption required by the step 3(c) of the siloxane hydrogen carrier of formula (I) production/regeneration process may be comprised between 1 and 50 kWh/kg of produced Si.

In an embodiment according to the present invention, the temperature of the method for the production of Si in the step 3(c) of the siloxane hydrogen carrier of formula (I) production/regeneration process may vary in a wide range, and may range notably from 500° C. to 2000° C.

In an embodiment according to the present invention, the pressure of the method for the production of Si in the step 3(c) of the siloxane hydrogen carrier of formula (I) production/regeneration process may vary in a wide range, and may range notably from 1 to $1 \cdot 10^7$ Pa.

In an embodiment according to the present invention, the step 3(c) of the siloxane hydrogen carrier of formula (I) production/regeneration process is characterised in that the mixture of hydrogen gas ($H_2$)/SiO molar ratio is superior or equal to 1. In an embodiment of the present invention, the said mixture of the $H_2$ and SiO is characterised by a $H_2$/SiO molar ratio which is comprised between 5 and 10. In an embodiment of the present invention, the said mixture of the $H_2$ and SiO is characterised by a $H_2$/SiO molar ratio which is 6.

In an embodiment according to the present invention, the number of unitary operations (e.g. reaction, separation, purification, etc. . . . ) required by the step 3(c) of the siloxane hydrogen carrier of formula (I) production/regeneration process may be comprised between 1 and 10.

In an embodiment according to the present invention, the energy consumption required by the step 4 of the siloxane hydrogen carrier of formula (I) production/regeneration process may be comprised between 1 and 50 kWh/kg of produced [$H_2SiX_2$, preferably $H_2SiCl_2$].

In an embodiment according to the present invention, the number of unitary operations (e.g. reaction, separation, purification, etc. . . . ) required by the step 4 of the siloxane hydrogen carrier of formula (I) production/regeneration process may be comprised between 1 and 20.

The controlled hydrolysis of halosilanes of step 5 according to the present invention can advantageously be illustrated as depicted in FIG. 2.

In an embodiment according to the present invention, the energy consumption required by the step 5 of the siloxane hydrogen carrier of formula (I) production/regeneration process may be comprised between 1 and 50 kWh/kg of produced [H$_2$SiO], [H$_2$SiO] being the repeating unit in the siloxane hydrogen carrier of formula (I).

In an embodiment according to the present invention, the temperature of the method in the step 5 of the siloxane hydrogen carrier of formula (I) production/regeneration process may vary in a wide range, and may range notably from −50° C. to 100° C.

In an embodiment according to the present invention, the pressure of the method for the production of the siloxane hydrogen carrier of formula (I) in the step 5 of the siloxane hydrogen carrier of formula (I) production/regeneration process may vary in a wide range, and may range notably from 1 to 1.10$^7$ Pa.

In an embodiment according to the present invention, the number of unitary operations (e.g. reaction, separation, purification, etc. . . . ) required by the step 5 of the siloxane hydrogen carrier of formula (I) production/regeneration process may be comprised between 1 and 10.

The following terms and expressions contained herein are defined as follows:

hydrogen carriers are either solid-state or liquid-state materials that contain hydrogen atoms, readily releasable as molecular dihydrogen (H2) when needed.

It should be obvious to those skilled in the art that the present invention enables embodiments under numerous other specific forms without leaving the field of application of the invention as claimed. Consequently, the present embodiments must be considered as illustrations, but may be modified in the defined field by the scope of the attached claims, and the invention must not be limited to the details given above.

EXAMPLES

Example 1: Example of Synthesis of a ClH$_2$SiO—(H$_2$SiO)$_x$—SiH$_2$Cl Species Mixture

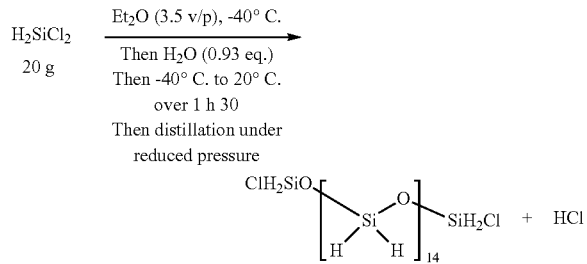

A 250 mL double-jacket glass reactor was charged with diethylether (70 mL, 3.5 volume of solvent per weight of dichlorosilane) under inert atmosphere prior to be cooled to −40° C. Dichlorosilane (20 g) was introduced into the reactor by bubbling in diethylether under stirring at −40° C. Distilled water (3.3 mL, 0.25 mL/min) was added dropwise whilst maintaining the reacting medium below −30° C. thanks to this controlled addition of water together with the controlled reactor cooling. The reaction was allowed to warm to 20° C. over 1 h30, thanks to the reactor temperature control (e.g. by reducing or stopping the cooling of the reactor—or even by heating the said reactor).

The crude mixture was purified by distillation leading to the isolation of two fractions:

43.8 g of a volatile fraction containing the diethylether and cyclic siloxane hydrogen carriers of formula (II). These compounds are obtained in an 4% (estimated by $^1$H NMR) diethylether solution, representing thus 1.7 g of cyclic compounds.

5.97 g of a non-volatile fraction obtained as a colorless liquid. This fraction contained a mixture of ClH$_2$SiO—(H$_2$SiO)$_x$—SiH$_2$Cl species (identified by $^1$H NMR) centered on an average structure where x=14 (hence an average molar mass of 793 g/mol) (isolated yield=51%, mole fraction of ClH$_2$SiO—(H$_2$SiO)$_x$—SiH$_2$Cl species in the mixture=83%).

Example 2: Example of Synthesis of a (H$_2$SiO)$_x$/ClH$_2$SiO—(H$_2$SiO)$_x$—SiH$_2$Cl Mixture In a 250 mL Schlenk flask, connected to a refrigerant at −25° C. itself connected to a NaOH trap, was introduced dry dichloromethane (160 mL) under inert atmosphere. The reacting medium was cooled to −25° C. via a liquid nitrogen bath prior dichlorosilane (20.0 g, 0.198 mol) was introduced. The liquid nitrogen bath was replaced by an ice bath. The reaction was warmed to 0° C. and water (0.186 mol, 0.94 eq.) was introduced via a syringe-pump (4.45 mL/h). The reaction was left under stirring for 1 h. The reaction was warmed to 25° C. over 1 h. The reaction was then degassed via nitrogen stripping for 1 h. The crude mixture was distilled under reduced pressure yielding 10.5 g of a colorless liquid. The product was analysed by $^1$H and $^{29}$Si NMR in CDCl$_3$: $^1$H NMR (CDCl$_3$, 273K), 400 MHz: δ 4.71 (s, 2H, SiH$_2$); $^{29}$Si NMR (CDCl$_3$, 273K), 400 MHz: δ −47.04 (s, (H$_2$SiO)$_4$), δ −48.77 (s, (H$_2$SiO)$_5$), δ −49.09 (s, (H$_2$SiO)$_6$), δ −49.17 (s, (H$_2$SiO)$_7$), δ 49.24 (s, (H$_2$SiO)$_5$), δ −22.0 (s, OSiCl), δ −28.47 (s, OSiCl), δ −29.98 (s, OSiCl), δ −30.30 (s, OSiCl), δ 30.41 (s, OSiCl), δ −46.78 (s, OSiCl), δ −47.75 (s, OSiCl), δ −47.92 (s, OSiCl), δ −47.96 (s, OSiCl), δ 31 48.87 (s, OSiCl), δ−48.91 (s, OSiCl).

Example 3: Example of H$_2$ Production from a ClH$_2$SiO—(H$_2$SiO)$_x$—SiH$_2$Cl Species Mixture Centered on ClH$_2$SiO—(H$_2$SiO)$_{14}$—SiH$_2$Cl Description of the Experimental Set-Up A 60 mL PET preform was connected (by screwing) to a pressure tight ball lock coupler featuring an outlet nozzle for hydrogen gas evacuation and a female thread to which a stainless needle, equipped with a stainless stopcock, was crimped for reactants injection. The hydrogen gas outlet nozzle was connected to a flowmeter in order to monitor the kinetic of the hydrogen release. The hydrogen gas was collected in an inverted 2 L graduated measuring cylinder filled with water used as an additional volume measuring device. The flow of hydrogen gas released into the measuring cylinder was controlled by a needle valve.

Figure 5:
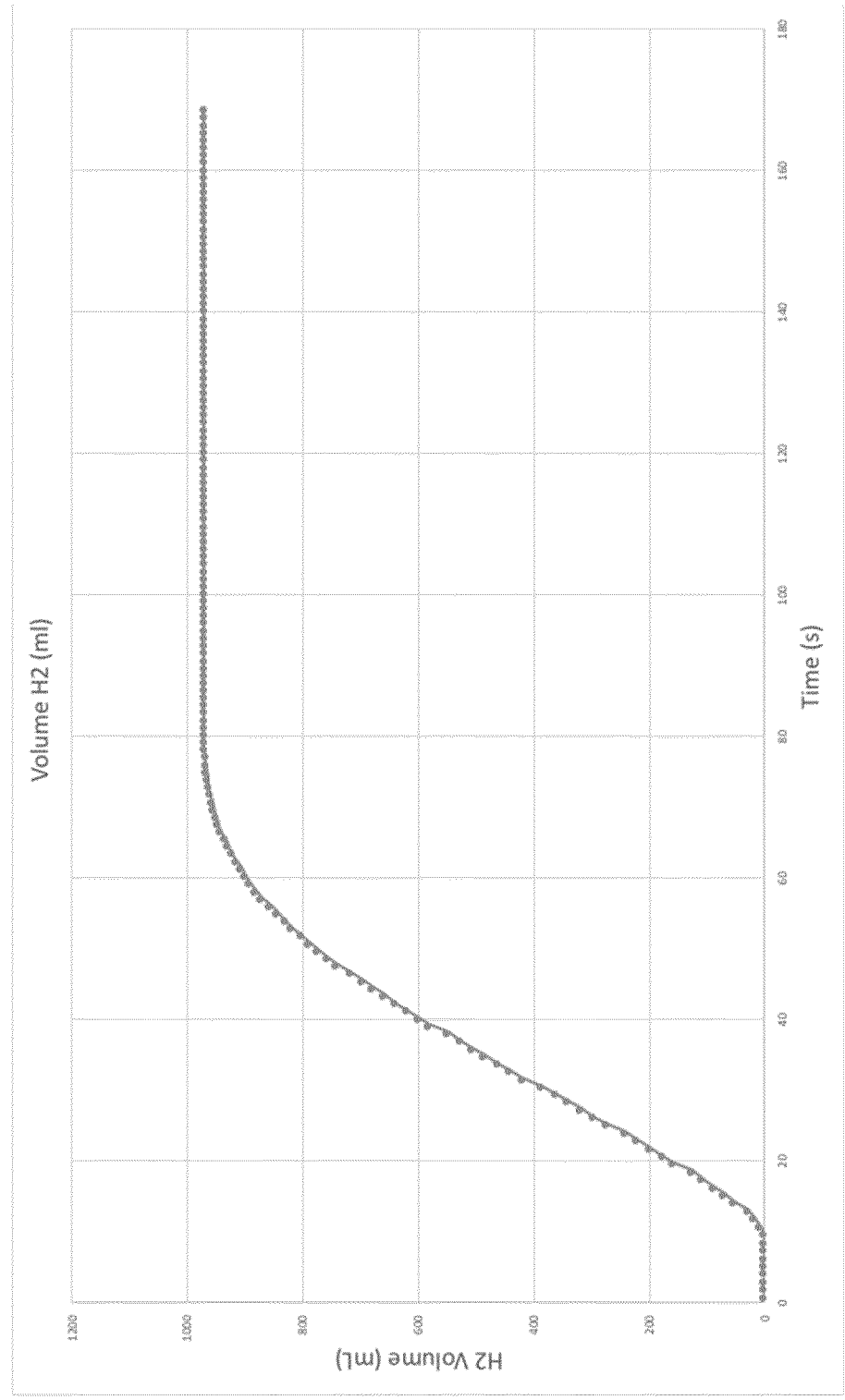
FIG. 5 illustrates the $H_2$ production from 1 g of $ClH_2SiO-(H_2SiO)_x-SiH_2Cl$ species mixture centered on the $ClH_2SiO-(H_2SiO)_{14}-SiH_2Cl$ species.

In a 60 mL PET preform was charged 1.000 g (1.26 mmol, 1.0 equiv.) of ClH$_2$SiO—(H$_2$SiO)$_{14}$—SiH$_2$Cl and 5 mL of NaOH (20 wt % in water, 30.5 mmol, 1.5 equiv/[H$_2$Si]) was quickly added with a 5 mL syringe via the injection needle onto the reacting medium under vigorous stirring. The stopcock was closed and 970 mL (>99% yield) of hydrogen gas were collected in the measuring cylinder over a period of 70 seconds (cf. FIG. 5).

The invention claimed is:

1. A liquid linear siloxane hydrogen carrier compounds of formula (I):

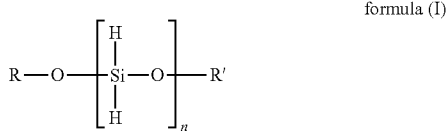

formula (I)

wherein n is an integer superior or equal to one, wherein R and R' comprises Si and hydrogen and/or oxygen and/or halogen, wherein radicals R and R' don't contain carbon and wherein R and/or R' comprises halogen.

2. The siloxane hydrogen carrier compounds according to claim 1 which are selected amongst compounds:
$H_3SiOH_{2n}Si_nO_nSiH_2X$, $H_2SiOH_{2n}Si_nO_nSiHX_2$, $H_2SiOH_{2n}Si_nO_nSiX_3$, $XH_2SiOH_{2n}Si_nO_nSiH_2X$, $XH_2SiOH_{2n}{}^{Si}{}_nO_nSiHX_2$, $XH_2SiOH_{2n}Si_nO_nSiH_2OH$, $XH_2SiOH_{2n}Si_nO_nSiH(OH)_2$, $XH_2SiOH_{2n}Si_nO_nSi(OH)_3$, $X_2HSiOH_{2n}Si_nO_nSiH_2X$, $X_2HSiOH_{2n}Si_nO_nSiHX_2$, $X_2HSiOH_{2n}Si_nO_nSiH_2OH$, $X_2HSiOH_{2n}Si_nO_nSiH(OH)_2$, $X_2HSiOH_{2n}Si_nO_nSi(OH)_3$, $X_3SiOH_{2n}Si_nO_nSiH_2X$, $X_3SiOH_{2n}Si_nO_nSiHX_2$, $X_3SiOH_{2n}Si_nO_nSiX_3$, $X_3SiOH_{2n}Si_nO_nSiH_2OH$, $X_3SiOH_{2n}Si_nO_nSiH(OH)_2$, $X_3SiOH_{2n}Si_nO_nSi(OH)_3$,
or a mixture of one or more of these compounds, with X being a halogen and n being an integer superior or equal to 1.

3. The siloxane hydrogen carrier compounds according to claim 1 wherein n is superior or equal to 2.

4. The siloxane hydrogen carrier compounds according to claim 3 wherein n is inferior or equal to 500.

5. The siloxane hydrogen carrier compounds according to claim 1 wherein the halogen is Cl.

6. The siloxane hydrogen carrier compounds according to claim 1 which are selected amongst compounds $ClH_2SiOH_{2n}Si_nO_nSiH_2Cl$.

7. A blend of the siloxane hydrogen carrier compounds according to claim 1 together with a cyclic siloxane compound having the formula (II)

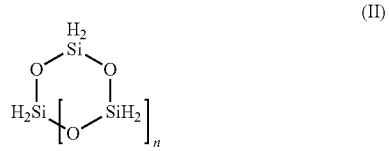

(II)

wherein n is an integer superior or equal to one.

8. The blend according to claim 7 wherein, in formula (II), n is superior or equal to 2.

9. The blend according to claim 8 wherein, in formula (II), n is inferior or equal to 500.

10. A method for production of hydrogen by hydrolytic oxidation of the siloxane hydrogen carrier compound according to claim 1, in the presence of water.

11. The method for the production of hydrogen according to claim 10 wherein the water/[SiOH$_2$] unit molar ratio is superior or equal to 0.1.

12. A process for the production of the siloxane hydrogen carrier compound according to claim 1 consisting in reaction routes Y and/or Z comprising the following steps:
providing a silica compound and/or a silicate compound, for reaction route Y,
subjecting the silica compound and/or silicate compound to a reduction step to produce silicon;
for reaction route Z,
subjecting the silica compound and/or silicate compound to a halogenation step to produce silicon tetrahalide, and
subjecting the silicon tetrahalide to a reduction step to produce silicon;
for reaction routes Y and Z,
subjecting silicon to a hydrohalogenation step to produce halosilane, and
subjecting the halosilane to a hydrolysis step to produce the halogen terminated carbon-free liquid linear siloxane hydrogen carrier compound(s) wherein the hydrolysis is between H$_2$O and H$_2$SiX$_2$ and is performed under operating conditions characterised in that the [H$_2$O/H$_2$SiX$_2$] molar ratio is inferior to 0.99 and superior to 0.2.

13. A process for the regeneration of the siloxane hydrogen carrier compound according to claim 1 wherein the liquid siloxane hydrogen carrier compound is subjected to hydrolytic oxidation for the production of hydrogen and a silica and/or a silicate compound followed by reaction routes Y and/or Z to produce the liquid siloxane hydrogen carrier compound, wherein:
for reaction route Y, subjecting the silica compound and/or silicate compound to a reduction step to produce silicon; or
for reaction route Z, subjecting the silica compound and/or silicate compound to a halogenation step to produce silicon tetrahalide, and subjecting the silicon tetrahalide to a reduction step to produce silicon; or
for reaction routes Y and Z, subjecting silicon to a hydrohalogenation step to produce halosilane, and subjecting the halosilane to a hydrolysis step to produce the halogen terminated carbon-free liquid linear siloxane hydrogen carrier compound(s) wherein the hydrolysis is between H$_2$O and H$_2$SiX$_2$ and is performed under operating conditions characterised in that the [H$_2$O/H$_2$SiX$_2$] molar ratio is inferior to 0.99 and superior to 0.2.

14. A process for the regeneration of a the siloxane hydrogen carrier compound according to claim 1 wherein the liquid siloxane hydrogen carrier compound is subjected to hydrolytic oxidation for the production of hydrogen and a silica and/or a silicate compound followed by reaction routes Y and/or Z to produce the liquid siloxane hydrogen carrier compound wherein the regenerated siloxane hydrogen carrier compound is chemically identical to the siloxane hydrogen carrier compound subjected to hydrolytic oxidation, wherein:
for reaction route Y, subjecting the silica compound and/or silicate compound to a reduction step to produce silicon; or
for reaction route Z, subjecting the silica compound and/or silicate compound to a halogenation step to produce silicon tetrahalide, and subjecting the silicon tetrahalide to a reduction step to produce silicon; or for reaction routes Y and Z, subjecting silicon to a hydrohalogenation step to produce halosilane, and subjecting the halosilane to a hydrolysis step to produce the halogen terminated carbon-free liquid linear siloxane hydrogen carrier compound(s) wherein the hydrolysis is between $H_2O$ and $H_2SiX_2$ and is performed under operating conditions characterised in that the [$H_2O/H_2SiX_2$] molar ratio is inferior to 0.99 and superior to 0.2.

15. The process for the production and/or regeneration of the halogen terminated carbon-free liquid linear siloxane hydrogen carrier compound(s) according to claim 12 wherein the hydrolysis is between $H_2O$ and $H_2SiX_2$ and is performed under operating conditions characterised in that the [$H_2O/H_2SiX_2$] molar ratio is inferior to 0.98.

16. The process for the production and/or regeneration of the halogen terminated carbon-free liquid linear siloxane hydrogen carrier compound(s) according to claim 15 characterised in that the [$H_2O/H_2SiX_2$] molar ratio is superior to 0.25.

17. The process for the production and/or regeneration of the halogen terminated carbon-free liquid linear siloxane hydrogen carrier compound(s) according to claim 12 wherein the speed of addition of water into the reacting medium is higher than 0.05 mL of water per minute and per 20 g of $H_2SiX_2$.

18. The process for the production and/or regeneration of the halogen terminated carbon-free liquid linear siloxane hydrogen carrier compound(s) according to claim 12 wherein the speed of addition of water into the reacting medium is less than 5.00 ml of water per minute and per 20 g of $H_2SiX_2$.

19. The process for the production and/or regeneration of the halogen terminated carbon-free liquid linear siloxane hydrogen carrier compound(s) according to claim 12 wherein the hydrolysis is performed under operating conditions wherein the temperature of the reacting medium is maintained between −50° C. and +100° C. over the whole hydrolysis reaction duration.

20. The process for the production and/or regeneration of the halogen terminated carbon-free liquid linear siloxane hydrogen carrier compound(s) according to claim 19 wherein the hydrolysis comprises a step of addition of water during which the temperature is maintained between −50° C. and 0° C.

21. The process for the production and/or regeneration of the halogen terminated carbon-free liquid linear siloxane hydrogen carrier compound(s) according to claim 19 wherein the hydrolysis comprises a step, subsequent to the step of addition of water, during which the reaction continues and the reacting medium is allowed to warm to a temperature from −30° C. to 20° C.

22. The process for the production and/or regeneration of the halogen terminated carbon-free liquid linear siloxane hydrogen carrier compound(s) according to claim 12 wherein a distillation is performed after the hydrolysis step in order to isolate the halogen terminated carbon-free liquid linear siloxane hydrogen carrier compound(s).

23. A method of storage and transport of hydrogen and/or energy comprising: using a siloxane hydrogen carrier compound according to claim 1 for the storage and transport of hydrogen and/or energy.

24. The method of claim 23 wherein the hydrogen comes from a renewable energy production process and/or the energy originates from a renewable energy production process, an off-peak electricity production process, and/or a waste heat recovery process.

25. A method of carbon-free on demand release of hydrogen, comprising: using the siloxane hydrogen carrier compound according to claim 1 for the carbon-free on-demand release of hydrogen.

26. The siloxane hydrogen carrier compounds according to claim 1 wherein n is superior or equal to 3.

27. The siloxane hydrogen carrier compounds according to claim 1 wherein n is superior or equal to four.

28. The siloxane hydrogen carrier compounds according to claim 3 wherein n is inferior or equal to 50.

29. The blend according to claim 7 wherein, in formula (II), n is superior or equal to 3.

30. The blend according to claim 7 wherein, in formula (II), n is superior or equal to four.

31. The blend according to claim 8 wherein, in formula (II), n is inferior or equal to 32.

32. The blend according to claim 8 wherein, in formula (II), n is inferior or equal to 17.

33. The method for the production of hydrogen according to claim 10 wherein the water/[$SiOH_2$] unit molar ratio is comprised between 2 and 10.

\* \* \* \* \*